United States Patent
Vatchkov et al.

(10) Patent No.: US 7,464,063 B2
(45) Date of Patent: Dec. 9, 2008

(54) INFORMATION PROCESSOR, STATE JUDGING UNIT AND DIAGNOSTIC UNIT, INFORMATION PROCESSING METHOD, STATE JUDGING METHOD AND DIAGNOSING METHOD

(75) Inventors: Gantcho Lubenov Vatchkov, Kagawa (JP); Koji Komatsu, Kagawa (JP); Satoshi Fujii, Tokyo (JP); Isao Murota, Tokyo (JP)

(73) Assignee: Caterpillar Japan Ltd., Tokyo (JP)

( * ) Notice: Subject to any disclaimer, the term of this patent is extended or adjusted under 35 U.S.C. 154(b) by 211 days.

(21) Appl. No.: 10/560,585

(22) PCT Filed: Jun. 28, 2004

(86) PCT No.: PCT/JP2004/009478

§ 371 (c)(1),
(2), (4) Date: Dec. 13, 2005

(87) PCT Pub. No.: WO2005/001757

PCT Pub. Date: Jan. 6, 2005

(65) Prior Publication Data

US 2006/0142990 A1 Jun. 29, 2006

(30) Foreign Application Priority Data

Jun. 30, 2003 (JP) ............................ 2003-188218

(51) Int. Cl.
*G06F 17/00* (2006.01)
*G06F 19/00* (2006.01)
(52) U.S. Cl. ............................ 706/45; 706/15; 706/19
(58) Field of Classification Search ............ 706/45, 706/15, 19; 703/2
See application file for complete search history.

(56) References Cited

U.S. PATENT DOCUMENTS 6,314,413 B1 * 11/2001 Otte ........................... 706/15

(Continued)

FOREIGN PATENT DOCUMENTS

JP 5-272994 A 10/1993

(Continued)

OTHER PUBLICATIONS

Delgado "Control of Nonlinear Systems Using a Self-Organising Neural Network", Springer, 2000.*

(Continued)

*Primary Examiner*—Joseph P Hirl
*Assistant Examiner*—Adrian L Kennedy
(74) *Attorney, Agent, or Firm*—Birch, Stewart, Kolasch & Birch, LLP

(57) ABSTRACT

An information processor, a state judging unit, a diagnostic unit, an information processing method, a state judging method and a diagnosing method aim at precisely recognizing each operation carried out by an object that functions in a number of operation modes. For this purpose, a number of combinations of n parameter values, concerning each of the operation modes, that vary with operation are detected by sensors (1a-1d) during the operation of the object, and a Self-Organizing Map creating means (2) creates Self-Organizing Maps, which corresponds one to each of the operation modes and which serve as individual separation models, regarding detection data based on the detected combination of parameter values as learning data.

20 Claims, 13 Drawing Sheets

U.S. PATENT DOCUMENTS

| | | | |
|---|---|---|---|
| 6,477,469 B2 * | 11/2002 | Ye et al. | 702/11 |
| 6,647,341 B1 * | 11/2003 | Golub et al. | 702/19 |
| 2002/0091655 A1 * | 7/2002 | Agrafiotis et al. | 706/26 |
| 2003/0017481 A1 * | 1/2003 | Golub et al. | 435/6 |

FOREIGN PATENT DOCUMENTS

| | | |
|---|---|---|
| JP | 10-333912 A | 12/1998 |
| JP | 11-338848 A | 12/1999 |
| JP | 2000-266570 A | 9/2000 |
| JP | 2001-331839 A | 11/2001 |
| JP | 2002-109536 A | 4/2002 |
| JP | 2002-323013 A | 11/2002 |

OTHER PUBLICATIONS

Kohonen, T. et al., "SOM_PAK: The Self-Organizing Map program Package," Jan. 1996, pp. 1-7, Report A31 Helsinski University of Technology, Faculty of Information Technology, Laboratory of Computer and Information Science, Finland.

Uchino, E. et al., "Dynamic Pruning of SOM by Using Updating Information of Weights," Sep. 200, pp. 379-382, 16th Fuzzy System Symposium (Akita, Sep. 6-8, 2000), Japan (http://www.cis.hut.fi/research/som-research/nnrc-programs.shtml).

Ohta, R. et al., "Ability of Growing Self-Organizing Map," IEICE Technical Report, Dec. 2001, pp. 27-34, vol. 101, No. 534, The Institute of Electronics, Information and Communication Engineers, Japan.

* cited by examiner

INFORMATION PROCESSOR, STATE JUDGING UNIT AND DIAGNOSTIC UNIT, INFORMATION PROCESSING METHOD, STATE JUDGING METHOD AND DIAGNOSING METHOD

BACKGROUND OF THE INVENTION

1. Field of the Invention

The present invention relates to an information processor, a state judging unit, a diagnostic unit, an information processing method, a state judging method and a diagnosing method for an object which functions in a number of operation modes.

2. Description of the Related Art

In recent years, the finite resources of the earth and excessive environmental burdens have lead to great need for new ways of maintaining machines that focus on resource circulation and reduction in environmental impact so that the contemporary society is converted from expendable to sustainable.

Conventional machine maintenance adapts corrective maintenance in which a broken down machine is repaired or uniform preventive maintenance which is performed at predetermined intervals. Corrective maintenance entails a lot of time and cost for repair. Preventive maintenance generates unnecessary parts and oil wastes due to its uniformity and thereby imposes greater costs on customers. Further preventive maintenance is expensive because of the intensive labor required. There is a requirement for a departure from such conventional maintenance manners and for conversion to predictive maintenance in the future.

In predictive maintenance, the degree of soundness is diagnosed by understanding data of load and environment during operation, a database of a history of past maintenance, physical failure and others and further deterioration and remaining life are predicted in order to find a defect on a machine at an early stage and provide a safe operation environment.

For example, Japanese Patent Application Laid-Open (KOKAI) No. 2002-323013 (hereinafter, referred to as patent reference 1) relates to an abnormality diagnostic unit for a working vehicle such as a construction machine; a pressure sensor for detecting discharge pressure from a hydraulic pump, an engine speed sensor for detecting engine speed, an oil temperature sensor for detecting the oil temperature in a hydraulic circuit and a communication device for radio transmitting detection data by these sensors to a network management center (a network station) are installed in a vehicle body of a working machine (a hydraulic excavator) and a monitoring station (e.g., an office of the manager of the working machine) obtains the detection data of the working machine from the network station through the Internet and diagnoses any abnormalities of the working machine based on the detection data.

Further, Japanese Patent Application Laid-Open (KOKAI) No. HEI 11-338848 (hereinafter, referred to as patent reference 2) relates to an abnormality detection unit for a fixed machinery facility such as a batch plant or a continuous plant; normal data when the object plant is in a normal state is previously collected, on the basis of the normal data, characteristics of the normal data are extracted using a Self-Organizing Map; on the basis of the characteristics, a characteristic map indicating distance relationships between outputting units are created and stored as a normal state model, and an abnormality of the object plant is detected based on the normal state model and input data (input vectors) Here, the normal state model is formed by converting multi-dimensional data into a visualized two-dimensional map as shown in FIG. 13 (in which the multi-dimensional data is classified into five clusters expressed by regions with symbols $R_1$-$R_5$), and if the input data has a characteristic identical to the normal state model, the input data is judged to be normal data. The technique of patent reference 2 can totally detect an abnormality of multi-dimensional input data in real time.

A construction machine such as a hydraulic excavator mentioned above has multi-dimensional parameters (detection factors) of working pressure to control the machine body moving forward and backward and slewing, working pressure of a bucket cylinder to control the bucket, working pressure of a stick cylinder to control the stick, and working pressure of the boom cylinder to control the boom in addition to engine speed, discharge pressure from a hydraulic pump and oil temperature in a hydraulic circuit.

A construction machine carries out an operation series by combining a number of working operations (i.e., working modes). For example, an operation series whereby piled earth and sand are loaded onto the vessel (container) of a truck can be roughly divided into four working modes (operation modes) of "an operation from the beginning to the end of shoveling earth and sand with the bucket (working mode 1)", "operation of slewing the machine body to move the bucket loaded with earth and sand to the point over the vessel of the truck after shoveling earth and sand (working mode 2)", "operation from opening the bucket to transfer earth and sand to the vessel to completing the transfer (working mode 3)" and "operation from returning the bucket to the piled earth and sand to being ready for operation mode 1 (working mode 4)".

Namely, each parameter value varies with operation mode but analysis of each individual parameter value frequently cannot result in precise abnormal diagnosis. For example, although each individual parameter value is within a normal range the current working operation may not totally correspond to any one of the above four operation modes (in macro view). In this case, the working operation is presumed to be in an unknown operation mode or to have something wrong.

For diagnosing a machine, whether or not the current working operation conforms with one of the operation modes previously classified is judged and, if the current working operation conforms with no operation mode, the machine is judged to be in an operation mode other than the above operation modes or to have something wrong, so that it seems that the abnormality in the machine can be found more rapidly. For this reason, if all the possible operation modes of a machine of a diagnosing object are precisely recognized in advance, an operation mode corresponding to the current working operation can be judged in real time based on multi-dimension parameter values.

Considering the conventional technique from this viewpoint, using the Self-Organizing Map of patent reference 2 can classify each operation mode of the machine even if a parameter is multi-dimensional.

However, if a machine has a large number of operation modes, clusters substantially identical in quantity to the operation modes are formed in a single two-dimensional Self-Organizing Map, so that further increasing in quantity of operation modes reduces the area of each cluster and overlaps between adjacent clusters is intensified to make the boundaries less clear. Such a two-dimensional map can be visually classified, but classification requires human judgment that may not be precise. Further, if a new operation mode is to be added, the Self-Organizing Map has to be recreated from the beginning whereupon diagnosing the machine may take much longer.

The description so far has used the example of a construction machine but the diagnostic unit can also be applied to many diagnosing objects (objects) whose operations (or variation of parameters) can be classified into a number of operation modes (or variation modes).

With the foregoing problems in view, the object of the present invention is to provide an information processor, a state judging unit, a diagnostic unit, an information processing method, a state judging method and a diagnosing method for precisely recognizing each operation carried out by an object, such as a machine, that functions in a number of operation modes.

SUMMARY OF THE INVENTION

In order to solve the above problems, the present invention takes the following means.

Namely, an information processor of the present invention comprises: detecting means for detecting a multiplicity of combinations of n parameter values, where n is a natural number, for each of a plurality of operation modes in which an object functions, which values vary with operation; and Self-Organizing Map creating means for creating a Self-Organizing Map by using detection data, obtained on the basis of the multiple combinations of parameter values detected by the detecting means, as learning data; wherein the Self-Organizing Map creating means creates a plurality of the Self-Organizing Maps, serving as individual separation models and corresponding one to each of the plurality of operation modes.

An object is not only a structure that operates itself but also an entity, such as the weather, whose state varies. Additionally, a Self-Organizing Map here does not represent only a visualized two-dimensional map but shows distribution of neurons which have been trained using learning data in a predetermined dimensional space.

With this configuration, since the Self-Organizing Map creating means creates Self-Organizing Maps which serve as individual separation models and which correspond one to each of the operation modes of the object, each operation performed by the object that functions in a number of operation modes can be precisely recognized.

Preferably, the detection data may be 2n-dimensional data including the n parameter values, which have been detected and which indicate a momentary state of the object, and n values that are obtained by differentiating the n parameter values which have been detected with respect to time and that indicate a variation in the momentary state of the object.

Consequently, it is possible to grasp the tendency in the data trajectories that can be features of individual operation modes more precisely so that a Self-Organizing Map with higher accuracy can be obtained.

Further preferably, the detecting means may detect the multiple combinations of n parameter values; and the Self-Organizing Map creating means may initially arrange a predetermined number of neurons at random in a 2n-dimensional space, may carry out training regarding a point (corresponding to a predetermined number of combinations (e.g., a predetermined number TD) of detection data pieces obtained based on the detection result by the detecting means) of the detection data in the 2n-dimensional space as a learning data point, may create a Self-Organizing Map candidate regarding a neuron having a minimum distance to the learning data point as a winning neuron, and may select, from two or more of the Self-Organizing Map candidates obtained by carrying out the creating of a Self-Organizing Map candidate a number of times, a Self-Organizing Map candidate which has a characteristic closest to that of the learning data as the Self-Organizing Map.

That results in that the selected Self-Organizing Map can be regarded as a characteristic closest to that of the learning data.

Further preferably, the Self-Organizing Map creating means may calculate an average of distances of the winning neurons to the points in the learning data and a standard deviation of the distances of the winning neurons to the points in the learning data for each of the Self-Organizing Map candidates, and may select a Self-Organizing Map candidate the average and the standard deviation of which are both minimum as the Self-Organizing Map. Winning neurons here are all the neurons each of which has a history of being a winning neuron (in other words, has become a winning neuron at least once).

With this configuration, a Self-Organizing Map that characterizes the learning data the most can be selected.

Still further, if there is no Self-Organizing Map candidate the average and the standard deviation of which are both minimum, the Self-Organizing Map creating means may select a Self-Organizing Map candidate the average of which is minimum as the Self-Organizing Map.

Further preferably, the Self-Organizing Map creating means may delete a neuron (referred to as an idling neuron) which has never become a winning neuron among neurons in the Self-Organizing Map that has been selected.

As a result, the characteristic of the learning data can be indicated by a Self-Organizing Map the neuron number of which is greatly reduced and the capacity for storing the Self-Organizing Map and time required for calculation using the Self-Organizing Map can therefore be saved.

A state judging unit for judging a state of an object of the present invention comprises: a storage unit for storing individual separation models in the form of the plural of the Self-Organizing Maps, created one for each of the plurality of operation modes by the above information processor; the detecting means; and judging means for judging which operation mode an operation of the object corresponds to based on a relative distance between a detection data point in 2n dimension corresponding to detection data obtained by the detecting means in real time and a winning neuron in each of the plural Self-Organizing Maps. A winning neuron here is a neuron having a shortest distance a (single) data point detected in real time.

This manner can improve the accuracy of judgment for an operation mode of the object.

Preferably, the detecting means may calculate the relative distance by dividing the distance between the detection data point obtained by the detecting means in real time and the winning neuron in each of the Self-Organizing Maps by the average of distances of the wining neurons in the Self-Organizing Map to the learning data point used in the process of creating each of the Self-Organizing Maps in the information processor.

Further preferably, the judging means may judge that, if the relative distance of each of the plural Self-Organizing Maps is equal to or smaller than a predetermined threshold value, the detection data point conforms with the Self-Organizing Map, and that, if the relative distance of the one Self-Organizing Map is larger than the threshold value, the detection data point does not conform with the one Self-Organizing Map. Further preferably, if there are two or more conforming Self-Organizing Maps, all the conforming Self-Organizing Maps may be selected as candidates or the Self-Organizing Map the relative distance of which is the minimum is selected as the best Self-Organizing Map.

A diagnostic unit, including the above state judging unit, for diagnosing the object, and the object may preferably be in a machine including a construction machine, and the plural operation modes represent a particular operation performed by the machine. For example, the diagnosing here is a judgment as to whether or not an operation mode of a machine or the like is normal.

This diagnostic unit can diagnose a particular operation mode of a machine or the like.

An information processing method of the present invention comprises: detecting a multiplicity of combinations of n parameter values, where n is a natural number, for each of a plurality of operation modes in which an object functions, which values vary with operation; creating a Self-Organizing Map by using detection data, obtained on the basis of the multiple combinations of parameter values detected in the step of detecting, as learning data; wherein, in the step of Self-Organizing-Map creating, a plurality of the Self-Organizing Maps, serving as individual separation models, are created one for each of the plurality of operation modes.

Also in this method, an object is not only a structure that operates itself but also an entity, such as the weather, whose state varies, and an operation mode includes a variation mode. Additionally, a Self-Organizing Map is not a visualized two-dimensional map but shows distribution of neurons which have been trained using learning data in a predetermined dimensional space.

With this method, since the Self-Organizing Map creating means creates Self-Organizing Maps which serve as individual separation models and which correspond one to each of the operation modes of the object, each operation performed by the object that functions in a number of operation modes can be precisely recognized.

Preferably, the method may further comprise the step of, between the step of detecting and the step of Self-Organizing-Map creating, calculating n time-difference values by processing the n parameter values detected in the step of detecting, and the Self-Organizing Map may be created based on 2n-dimensional data including the n parameter values, which have been detected and which indicate a momentary state of the object, and the n time-difference values which have been calculated using the n parameter values and which indicate a variation in the momentary state of the object.

Consequently, it is possible to grasp the tendency in the data trajectories that can be features of individual operation modes more precisely so that a Self-Organizing Map with higher accuracy can be obtained.

Further preferably, the multiple combinations of n parameter values may be detected in the step of detecting; and the step of Self-Organizing-Map creating may include the sub-steps of creating a Self-Organizing Map candidate by initially arranging a predetermined number of neurons at random in a 2n-dimensional space, carrying out training regarding a point of the detection data in the 2n-dimensional space as a learning data point and creating a Self-Organizing Map candidate regarding a neuron having a minimum distance to the learning data point as a winning neuron, and selecting, from two or more Self-Organizing Map candidates created by carrying out the step of creating a Self-Organizing Map candidate a number of times, a Self-Organizing Map candidate which has a characteristic closest to that of the learning data as the Self-Organizing Map.

In this manner, the selected Self-Organizing Map can be treated as a characteristic closest to that of the learning data.

Still further preferably, the step of Self-Organizing-Map creating further includes a sub-step of, after the sub-step of selecting a Self-Organizing Map, deleting a neuron (i.e., an idling neuron) which has never become a winning neuron among neurons in the Self-Organizing Map that has been selected.

As a result, the characteristic of the learning data can be indicated by a Self-Organizing Map the neuron number of which is greatly reduced and the capacity for storing the Self-Organizing Map and time required for calculation using the Self-Organizing Map can therefore be saved.

Further preferably, when a Self-Organizing Map for a new operation mode of the object other than the plural operation modes is added, then parameter values may be detected by the step of detecting while the object is functioning in the new operation mode by the step of detecting; and a Self-Organizing Map for the new operation mode may be created regarding detection data based on a multiplicity of combinations of the parameter values that have been detected as learning data by the step of Self-Organizing-Map creating.

In the above manner, a Self-Organizing Map corresponding to a new operation mode can be added.

A state judging method of the present invention for judging which operation mode an operation of the object corresponds to using a plurality of Self-Organizing Maps, serving as individual separation models and created one for each of a plurality of operation modes by the above information processing comprises: detecting the n parameter values that vary with operation; and judging which operation mode an operation of the object corresponds to based on a relative distance between a detection data point in a 2n-dimensional space corresponding to detection data obtained in real time in the step of detecting and a winning neuron in each of the plural Self-Organizing Maps.

This method can enhance the accuracy of judgment for an operation mode of the object.

Preferably, the state judgment method may further comprise the step of, between the step of detecting and the step of judging, calculating n time-difference values by processing the n parameter values detected in the step of detecting, and the operation mode of the object may be judged based on 2n-dimensional data including then parameter values, which have been detected and which indicate a momentary state of the object, and the n time-difference values, which have been processing the n parameter values detected in the step of detecting and which indicate a variation in the momentary state of the object, in the step of judging.

Consequently, it is possible to grasp the tendency in the data trajectories that can be features of an individual operation mode more precisely so that a Self-Organizing Map with higher accuracy can be obtained.

Further preferably, the step of judging may comprise: obtaining the relative distance by dividing the distance between the detection data point obtained in real time in the step of detecting and the winning neuron in each of the Self-Organizing Maps by the average of distances of the wining neurons in the Self-Organizing Map to the learning data point used in the process of creating the Self-Organizing Map carried out by the information processor, if the relative distance of each of the plural Self-Organizing Maps is equal to or smaller than a predetermined threshold value, judging the detection data point to conform with the Self-Organizing Map, and if the relative distance of each of the Self-Organizing Maps is larger than the threshold value, judging the detection data point not to conform with the Self-Organizing Map. Further preferably, if there are two or more Self-Organizing Maps conforming, all the conforming Self-Organizing Maps may be selected as candidates or the Self-Organizing Map the relative distance of which is the minimum is selected as the best Self-Organizing Map.

It is thereby possible to enhance the accuracy of judgment for an operation mode of the object.

A diagnosing method of the present invention, including the above state judging method, for diagnosing the object wherein the object is a machine including a construction machine, and the plural operation modes represent a particular operation performed by the machine. The diagnosing here is a judgment as to whether or not an operation mode of a machine or the like is normal.

With this method, a particular operation mode of a machine or the like can be diagnosed.

Preferably, if there is no conforming Self-Organizing Map, the particular operation may be judged to be an unknown mode or an abnormal mode in the step of judging.

This method can diagnose whether or not an operation mode of a machine or the like is an unknown mode or an abnormal mode.

DETAILED DESCRIPTION OF THE INVENTION

Hereinafter, an embodiment of the present invention will now be described with reference to the accompanying drawings.

Figure 1:
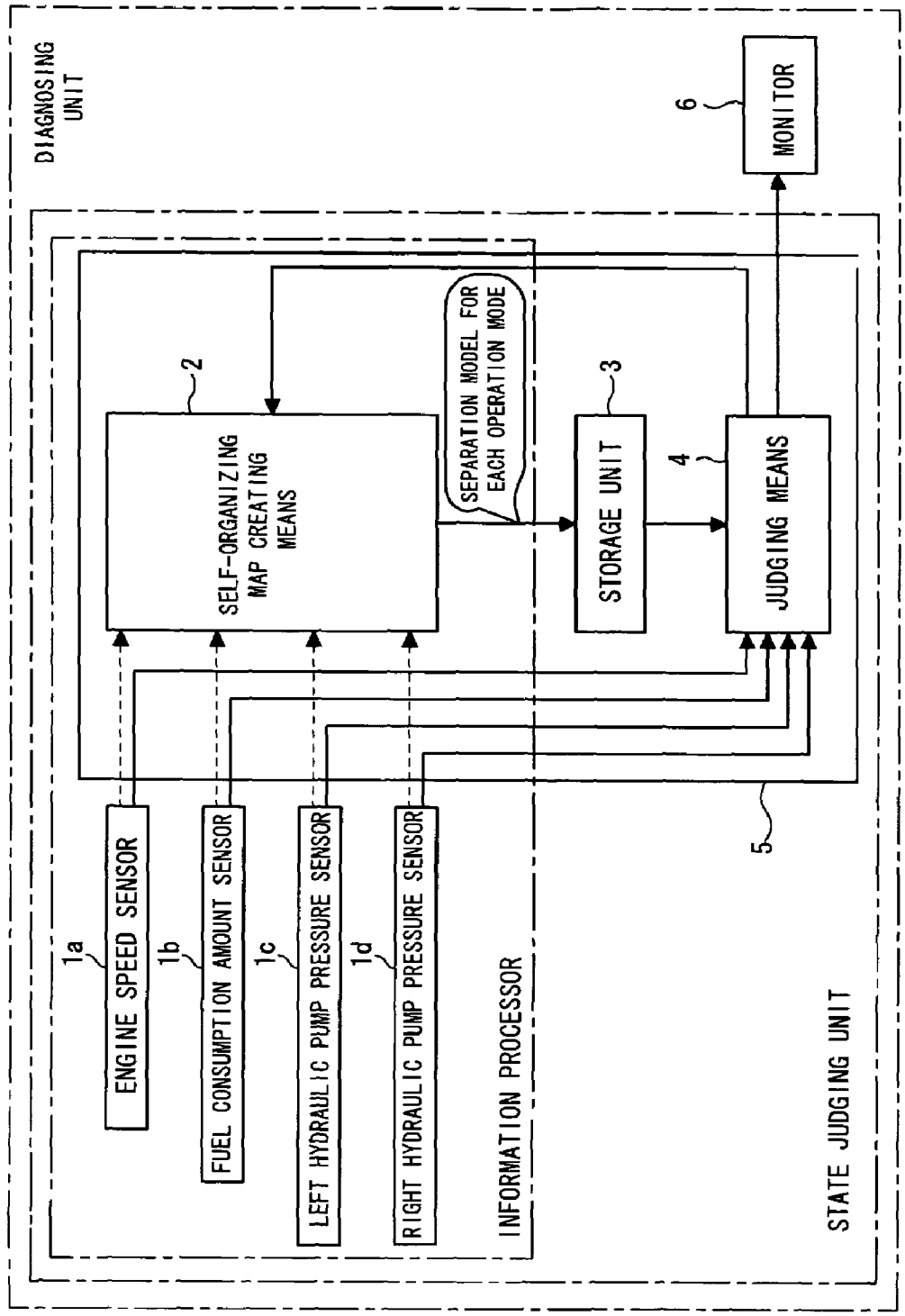
FIG. 1 is a block diagram showing a diagnostic unit according to an embodiment of the present invention.

FIG. 1 is a diagnostic unit according to an embodiment of the present invention. The diagnostic unit is installed in a machine such as a construction machine to diagnose whether or not the machine has something wrong. Hereinafter, description will be made on the assumption of the diagnostic unit applied to a hydraulic excavator functioning as a construction machine, for example. But, the present invention should by no means be applied only to such a construction machine and can be applied to any object that is operable (variable) in a number of operation modes (variation modes).

As shown in FIG. 1, the diagnostic unit mainly includes a number of sensors (detecting means) 1a-1d, an ECU (Electronic Control Unit) 5 with functions corresponding to Self-Organizing Map creating means 2, a storage unit 3 and judging means 4, and a monitor 6. The ECU 5 includes an input/output device, a storage device (RAM, ROM) in which a processing program is incorporated, a central processing unit (CPU) and others.

The sensors 1a-1d are prepared corresponding one to each of the parameters (variation factors) of the hydraulic excavator that is operable in a number of operation modes, and detect a multiple of combinations of parameter values that vary with operation performed by the hydraulic excavator concerning each of the operation modes. These sensors may directly detect corresponding parameter values or may obtain corresponding parameter values in the form of values estimated by performing arithmetic operations or the like on detected values.

Here, the parameters concerning operation of the hydraulic excavator are factors that vary with operation of the hydraulic excavator and are exemplified by engine speed, fuel consumption amount, hydraulic pump pressure (pressure of one or more hydraulic pumps), oil temperature in a hydraulic circuit, working pressure to control the machine body moving forward and backward and slewing, working pressure of a bucket cylinder to control the bucket, working pressure of a stick cylinder to control the stick, and working pressure of the boom cylinder to control the boom.

The present diagnostic unit includes the sensors 1a-1d, which detect engine speed, fuel consumption amount, and hydraulic pump pressures as representatives among these parameters. Specifically, the diagnostic unit includes four sensors 1a-1d; an engine speed sensor 1a to detect an engine speed, a fuel consumption amount sensor 1b to detect a fuel consumption amount, and a left hydraulic pump pressure sensor 1c and a right hydraulic pump pressure sensor 1d to detect pressures of the left and right hydraulic pumps, respectively. The diagnostic unit, of course, may include sensors to detect working pressures of the bucket cylinder, the stick cylinder, the boom cylinder and others, as mentioned above.

As one of the features of the present diagnostic unit, the Self-Organizing Map creating means 2 creates Self-Organizing Maps (hereinafter also called SOMs) serving as separation models corresponding one to each operation mode of the hydraulic excavator by using detection data based on a multiple of combinations of parameter values detected by the engine speed sensor 1a, the fuel consumption amount sensor 1b, the left hydraulic pump pressure sensor 1c and the right hydraulic pump pressure sensor 1d as learning data. As shown in FIG. 1, the information processor of the present invention is formed by the sensors 1a-1d described above and SOM creating means 2.

Each operation mode of the hydraulic excavator represents a certain operation (a particular operation). For example, an operation series whereby piled earth and sand are loaded on to the vessel (container) of a truck can be roughly divided into four working modes (operation modes) of "an operation from the beginning to the end of shoveling earth and sand with the bucket (working mode 1)", "operation of slewing the machine body to move the bucket loaded with earth and sand to a point over the vessel of the truck after shoveling earth and sand (working mode 2)", "operation from opening the bucket to transfer earth and sand to the vessel to completing the transfer (working mode 3)" and "operation from returning the bucket to the piled earth and sand to being ready for operation mode 1 (working mode 4)". The present invention will now be described assuming that the hydraulic excavator functions in the above four operation modes.

An ordinary Self-Organizing Map is a visualized recognition model in which multi-dimensional data is expressed in a two-dimensional space. However, a Self-Organizing Map can be used as one method for classifying multi-dimensional data into the classes previously given without visualizing the data in a two-dimensional space.

Description will now be made in relation to the general classification. Each data point $d_i$ (i=1, 2, ..., D) in D sets of a data cluster $\{d_1, d_2, ..., d_i, ..., d_D\}$ that have been obtained by measurement is formed by n parameter values (measurement characteristic values) which characterize a certain class $C_j$ (j=1, 2, ..., z). In other words, each data point $d_i$ is assumed to be $d_i=[P_1, P_2, ..., P_n]$. A technique (a model and an algorithm associated with the model) that can classify each data point $d_i$ into a proper class simply by reading n parameter values of the data point $d_i$ is required for proper classification of working modes.

This requires construction of initial knowledge based on learning data whose "answer" is known. The "answer" means an actual class that the learning data belongs to. Learning data is used for training a SOM (recognition model) (in other words, for gradually updating a SOM), and repetitiously performing such training is called "supervised learning". The SOM obtained in the above manner is used as a means for solving a classification problem.

In construction of a SOM, using a larger amount of learning data can create a more precise SOM. However, once the amount of learning data reaches a certain level, further increases in data amount only slightly improve the precision of the SOM, so the number of inputting learning data is preferably set to a predetermined number. The wording "class" corresponds to an "operation mode" in this embodiment.

As mentioned above, the present diagnostic unit creates SOMs, corresponding one to each of the operation modes of a hydraulic excavator, serving as individual separation models.

In other words, a single $SOM_j$ ($SOM_1$, $SOM_2$, ..., $SOM_z$) is created for each class $C_j$ ($C_1$, $C_2$, ..., $C_z$). Therefore, the present embodiment creates SOMs one for each of the four classes (operation modes). Training is performed on each SOM serving as a separation model using a large amount of learning data which clearly represents a single operation mode. Each SOM constructed by such training functions as a local and well trained Expert that is able to clearly recognize a single operation mode, so that it is possible to precisely recognize each of a number of operation modes in which an object functions.

Since one SOM learns a single operation mode and does not learn other operation modes, one SOM does not characterize knowledge of another operation mode at the same time.

Data which is detected by four sensors $1a$-$1d$ and which is input to the SOM creating means 2 includes four (n) parameter values d(k) that indicate a momentary state of the hydraulic excavator and four (n) values Δd(k) that are time-differences of the four parameter values and that indicate a variation in the momentary state of the hydraulic excavator, and is therefore in the form of 8-dimensional (2n-dimensional) data which totals four parameter values d(k) and 4 time-differences Δd(k) of the four parameter values.

As mentioned above, the SOM creating means 2 creates a SOM based on learning data including not only current parameter values d(k) but also difference values between the current parameter values d(k) and previous parameter values d(k−1), i.e., Δd(k)=d(k)−d(k−1).

Only to the current parameter values d(k) cannot obtain sufficient information representing dynamic operation of the entire hydraulic excavator. But, considering also Δd(k), as mentioned above, makes it possible to grasp more precisely the tendency of detection data trajectories which can be features of each individual operation mode, so that a SOM with a higher accuracy can be created.

This manner requires a longer learning time because the SOM that is to be created is twice the data size due to data d(k) and Δd(k). It is sufficient that calculation for the creation is performed only once when the SOM is trained, and therefore time-consuming calculations do not load the unit when the current operation mode is judged during operation of the hydraulic excavator.

The SOM creating means 2 initially arranges a predetermined number of neurons at random in an 8-dimensional (2n-dimensional) space; carries out training using the above learning data; creates a SOM candidate regarding a neuron having a minimum distance to the learning data point as a winning data; and selects, from two or more SOM candidates created by performing the above creating of a SOM candidate a number of times, a SOM candidate having a characteristic closest to that of the learning data as a SOM.

Specifically, the SOM creating means 2 calculates the average of distances to learning data points and winning neurons and the standard deviation of the distances of the learning data point to the winning neurons for each SOM candidate, and selects a SOM candidate the average and the standard deviation of which are both minimum as a SOM. Winning neurons here are all the neurons each of which has a history of being a winning neuron (in other words, has become a winning neuron at least once). Further at that time, if there is no SOM candidate the average and the standard deviation of which are both minimum, the SOM creating means 2 selects a SOM candidate the average of which is minimum as the SOM.

Further, the SOM creating means 2 deletes a neuron that has never become a winning neuron among the neurons in the selected SOM.

The training of SOMs in the above manner is preferably carried out prior to actual operation carried out by the hydraulic excavator or is preferably carried out separately from actual operation (in this embodiment, called the "off-line state" of the hydraulic excavator). For example, prior to the shipment of a hydraulic excavator from a manufacturer, the hydraulic excavator is experimentally operated along an operation series that will be actually carried out after the shipment and the SOM creating means 2 creates a SOM concerning each operation mode and stores the created SOMs in the storage unit 3.

While the hydraulic excavator actually functions at an operation site, the judging means 4 calculates a relative distance RD by dividing a distance between a detection data point in the 8-dimensional space corresponding to the detection data obtained in real time by the sensors $1a$-$1d$ and a winning neuron (detailed later) of each SOM stored in the storage unit 3 by the average of distances between the learning data points used for the process of creating the SOM by the SOM creating means 2 and winning neurons in the SOM.

Further, if the relative distance RD of a SOM is equal to or smaller than a predetermined threshold value (1+α), the judging means 4 judges that the detection data point conforms with the SOM and if the relative distance RD is larger than the threshold value (1+α), the judging means 4 judges that the detection data point does not conform with the SOM. The factor α represents reliability of the learning data and is preferably given a value of 0.2-0.3, for example.

If there is a SOM conforming with the detection data point, the judging means 4 judges that the detection data point belongs to an operating mode associated with the conforming SOM. For example, if the conforming SOM is associated with the operation mode 1, the detection data point is judged to belong to the operation mode 1. If there are two or more SOMs conforming with the detection data, the judging means 4 may select all the conforming SOMs as candidates (in this case, may give a candidate with a smaller relative distance a higher rank), or may select a SOM with minimum relative distance RD as the best SOM.

Conversely, if there is no SOM conforming with the detection data point, the detection data point is judged to belong to no operation mode. In this case, the detection data point is judged to belong to an "unknown mode" or an "abnormal mode". Additionally, regarding such an unknown mode as a new operation mode, the SOM creating means 2 can create a new SOM and store the new SOM in the storage unit 3.

As shown in FIG. 1, the state judging unit of the present invention is formed by the sensors $1a$-$1d$, the SOM creating means 2, the storage unit 3, and the judging means 4.

The monitor 6 shows results of judgments made by the judging means 4. In other words, if the judging means 4 judges that a detection data point belongs to one of the operation modes, the operation mode is displayed on the monitor 6. If the detection data point belongs to two or more operation modes, the operation modes may be displayed in an order of modes with smaller relative distances on the monitor 6. Further, if the detection data point is judged not to correspond to any operation mode, the monitor 6 displays that the detection data point is in an unknown operation mode (or a new operation mode) or an abnormal operation mode.

The diagnostic unit according to an embodiment of the present invention is constructed as mentioned above, and a process for diagnosing has two main parts of an off-line process which uses off-line data flow and a real-time process using real-time data flow.

Figure 10:
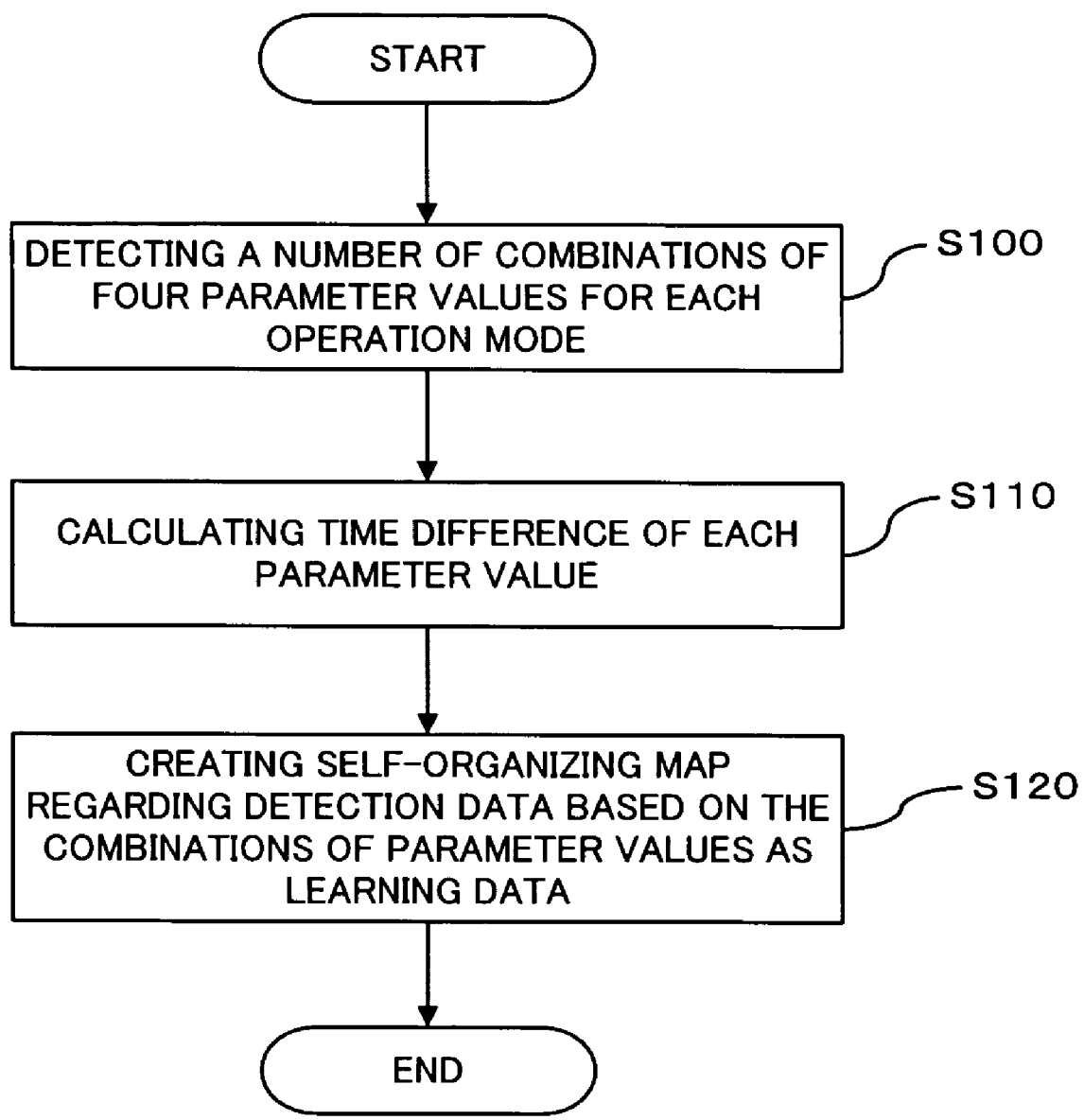
FIG. 10 is a flow chart showing an off-line process according to an embodiment of the present invention.

(A) Off-Line Process:

In this process, the SOM creating means 2 creates SOMs, one for each of the operation modes of the hydraulic excavator, serving as separation models, each of which clearly indicate an associated operation mode. The procedure of this process uses the information processing method according to this embodiment including the steps of detecting for data creation (step S100), calculating (S110), and creating a SOM (step S120) as shown in FIG. 10.

The step of detecting for data creation (step S100) obtains a large amount of detection data with high reliability for each of the operation modes of the hydraulic excavator. Specifically, in the present embodiment, a multiple of combinations of parameter values of each operation mode are obtained from the four sensors 1a-1d. Here, a parameter value at current time k is represented by d(k).

In the step of calculating (step S110), the parameter values detected in the step of detecting for data creation are processed to calculate time differences (including values corresponding to time differences such as variation rates of the parameter values (e.g., variation amounts per unit time such as a detection period or detection cycle)) Δd(k).

In the step of creating a SOM (step S120), a SOM, which is regarded as a separation model of each operation mode, is created using detection data {d(k), Δd(k)} based on the multiple combinations of parameter values d(k) obtained in the step of detecting for data creation and the multiple combinations of time-differences Δd(k) calculated in the step of calculating as learning data.

This off-line process requires time but is the most important steps that determine the quality of the SOM that is to be used for classification carried out in the later real-time process.

Figure 2:
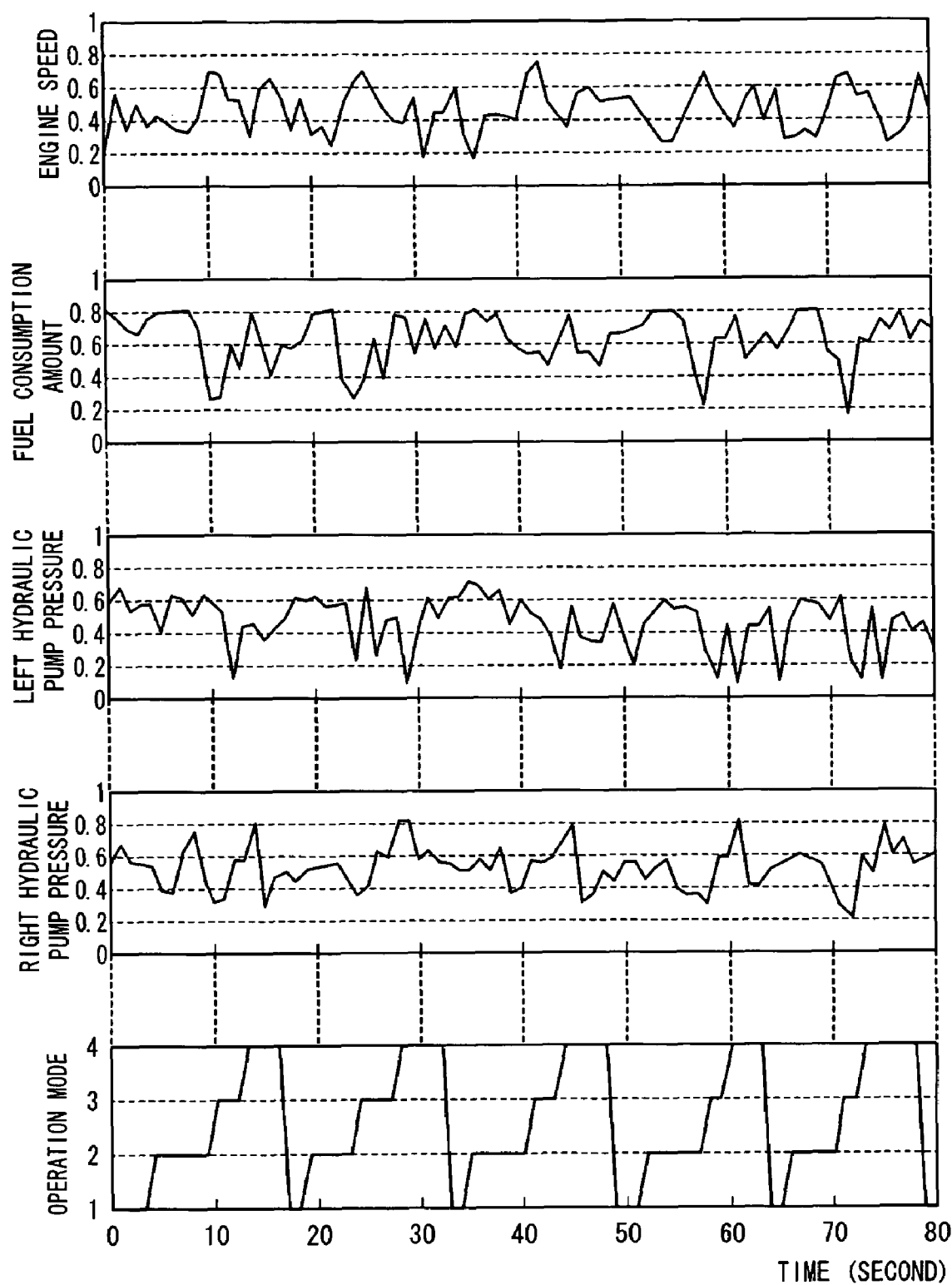
FIG. 2 is a graph showing output values from sensors corresponding to operation modes 1-4 of a hydraulic excavator according to an embodiment of the present invention.

FIG. 2 shows parameter values of the sensors 1a-1d when the hydraulic excavator repetitiously performs an operation series of the operation modes 1 through 4 and the horizontal axis represents a common time scale. The graphs respectively indicate engine speed, fuel consumption amount, left pump pressure, right pump pressure, and variation in operation mode from the top. As can be understood from FIG. 2, obtaining the same parameter values in the same operation mode (waveforms) is ideal but actual parameter values may be different even in the same operation modes. Therefore, training a SOM using a large amount of reliable learning data in this off-line process can create a SOM that characterizes each operation mode more clearly.

The above manner obtains a typical SOM for each operation mode. The concept of the training has the following feature. Since each SOM is trained concerning only one operation mode, there is no requirement for showing topological distances (vicinity, neighborhood) of neurons on a graph of a two-dimensional map expressed by using software of SOM known to the public. Obtaining a distribution (called "cloud" here) of neurons in an 8-dimensional space is sufficient for the SOM of the present embodiment.

Next, description will now be made in relation to a specific calculation process carried out in the step of creating a SOM.

Figure 11:
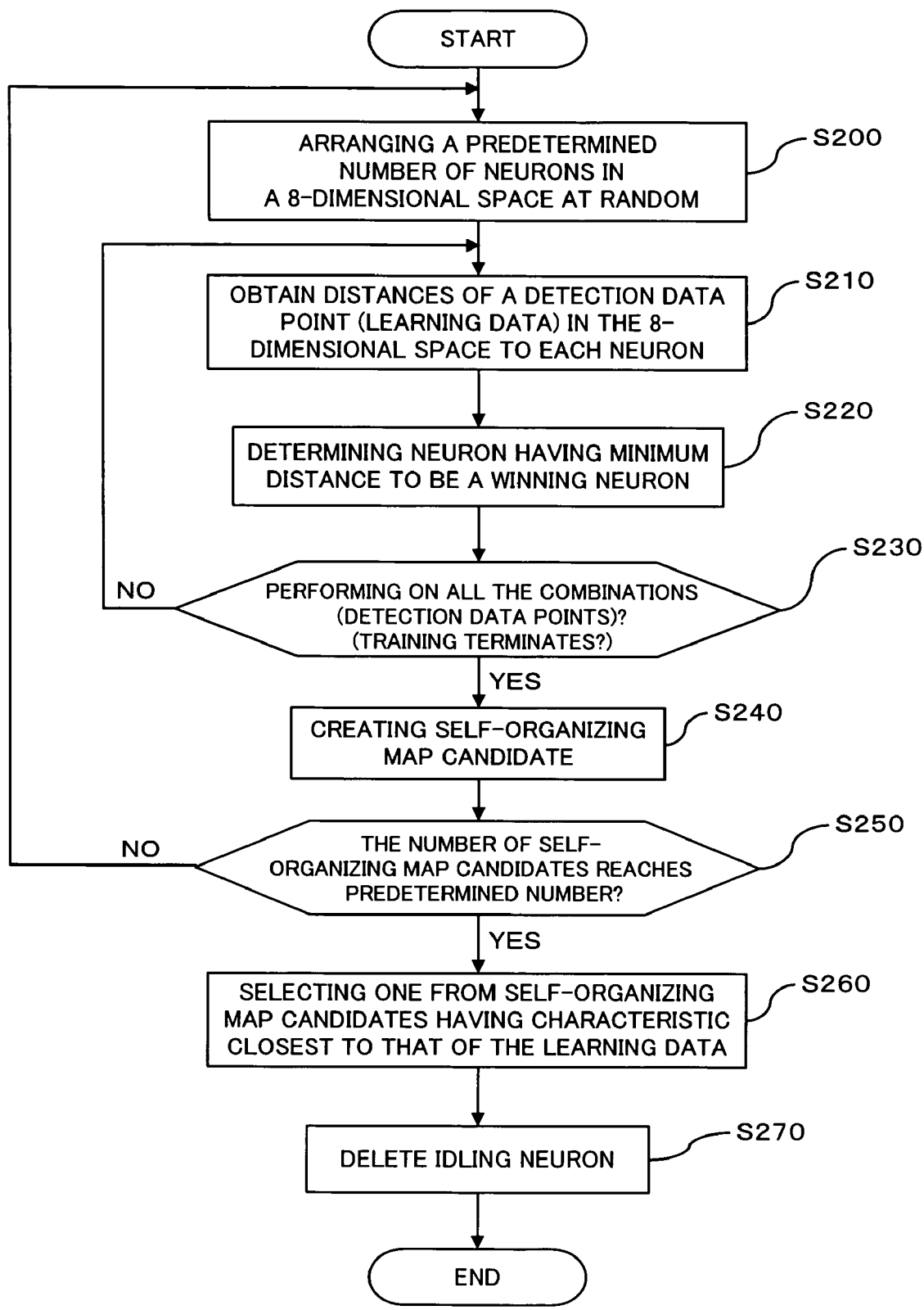
FIG. 11 is a flow chart showing a process carried out in a step of creating a Self-Organizing Map according to an embodiment of the present invention.

First of all, a predetermined number of neurons are arranged at random in the 8-dimensional space (step S200, the first step), as shown in FIG. 11. For each of the detection data points (regarded as learning data for creation of a SOM in the off-line process) in the 8-dimensional space, distances to the neurons are obtained (step S210). After that, the neuron having the minimum distance to the detection data point is determined to be a winning neuron. At the same time, not only the winning neuron but also neurons in the vicinity of the winning neuron are trained.

Here, the minimum distance MD is defined as the minimum value among the distances of the i-th detection data point to the neurons in a 2n-dimensional space. For example, if the distance to the j-th neuron is the minimum, the j-th neuron with the minimum distance is called the winning neuron. The minimum distance MD is expressed by the following formula (1);

$$MD(i) = \min_{1 \leq j \leq n} \{r(i, j)\} \quad (1)$$

where, $i = 1, 2, \ldots, TD$.

Here, $r(i, j)$ represents the distance between the i-th detection data point and the j-th neuron. Further, the distance $r(i, j)$ is calculated to be an Euclidean distance as known in an ordinary algorithms for a SOM. TD represents the number of (combinations of) learning data pieces.

After that, whether or not a SOM is trained using all the multiple of combinations is judged (step S230), and if the result of the judgment is negative (No judgment), the process shifts to step S210. On the other hand, if the result of the judgment is positive (Yes judgment), the process shifts to step S240 to create another SOM candidate. The SOM obtained at this stage can not always be the best SOM that definitely indicates a single operation mode and is therefore treated as a candidate. The steps S210 through S240 are the second step and the step of creating a SOM candidate is formed by the first and the second steps.

The above calculation process has created a SOM candidate for a certain operation mode. In the present embodiment, in order to obtain the best SOM with higher accuracy that expresses the feature of the operation mode more clearly, a number of SOM candidates are created, from which the best SOM is selected. For this purpose, whether or not the number of created SOM candidates reaches the number predetermined before the creation of a SOM is judged. If the result is No, the process shifts to step S200 to create another SOM candidate and conversely, if the result is Yes, the process shifts to step S260.

In step S260 (a step of selecting), one SOM candidate having a characteristic closest to that of the learning data is selected from the SOM candidates as a SOM. Here, the manner for selecting a best SOM in step S260 will now be detailed.

Important index values to characterize the distribution of neurons in a 2n-dimensional space are an average minimum distance $AV_{min}$ and the standard deviation $ST_{dev}$ of the minimum distances MD.

Figure 3:
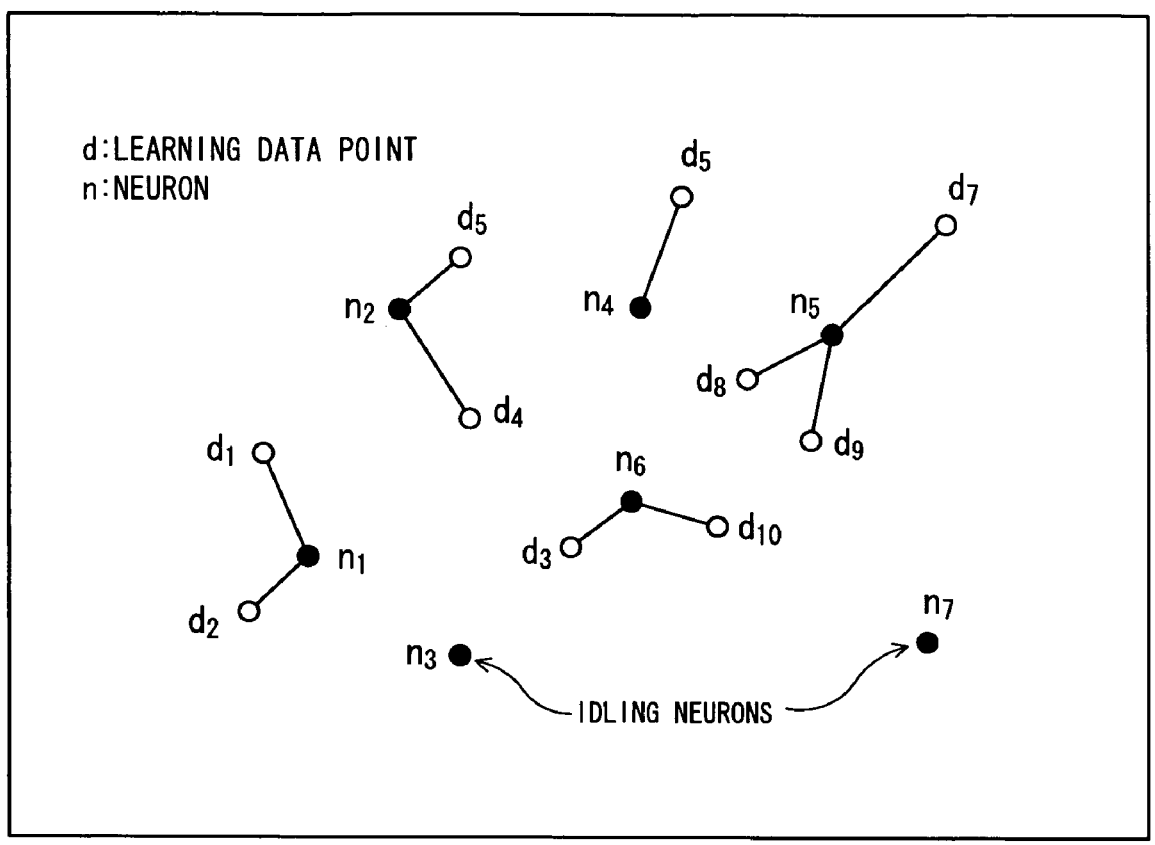
FIG. 3 is a diagram visually showing the minimum distances between learning data points (detection data points) and neurons in a Self-Organizing Map according to an embodiment of the present invention.

FIG. 3 is an example that visually indicates the minimum distances between ten detection data points (referred to as learning data points in FIG. 3 because detection data points are regarded as learning data in the off-line process) $d_1$-$d_{10}$ and seven neurons $n_1$-$n_7$. The average minimum distance $AV_{min}$ is the average of these minimum distances MD. The average minimum distance $AV_{min}$ is expressed by the following known formula (2);

$$AV_{\min} = \frac{1}{TD} \sum_{i=1}^{TD} MD(i) \quad (2)$$

Similar to the formula for the average minimum distance $AV_{min}$, standard deviation $ST_{dev}$ is obtained by the following known formula (3);

$$ST_{dev} = \sqrt{\frac{\sum_{i=1}^{TD} (MD(i) - AV_{\min})}{TD}} \quad (3)$$

On the basis of the average minimum distance $AV_{min}$ and the standard deviation $ST_{dev}$, the step S260 judges which SOM has a characteristic closest to that of the learning data among a number of SOMs that have been calculated to be candidates. At that time, a SOM candidate, the average minimum distance $AV_{min}$ and the standard deviation $ST_{dev}$ of which are both minimum, is selected as the best SOM that is the closest to the learning data characteristic.

If there is no SOM candidate the average minimum distance $AV_{min}$ and the standard deviation $ST_{dev}$ of which are both minimum, a SOM candidate the average minimum distance $AV_{min}$ of which is minimum is selected as the best SOM.

In this manner, it is possible to select a SOM that is the most characteristic of the detection data (learning data).

In step S270 (a step of deleting an idling neuron), one or more neurons (called "idling neurons" here) that have never become winning neurons in the selected SOM are deleted. For example, FIG. 3 shows two idling neurons $n_3$ and $n_7$, which are deleted after training the SOM. Application of such elimination of an idling neuron can express the learning data characteristic in terms of a SOM in which the number of neurons is greatly reduced, so that the capacity for retaining the SOM can be saved and the time required for future calculation using the SOM can be reduced.

As described in this embodiment, the merits of the use of one SOM (a separation model) for one operation mode are that the storage capacity can be greatly reduced by approximating an enormous number of detection data points that characterize the operation mode to neurons, the number of which are greatly reduced, and that classification carried out in the subsequent real-time process can be rapidly executed.

Figure 4A:
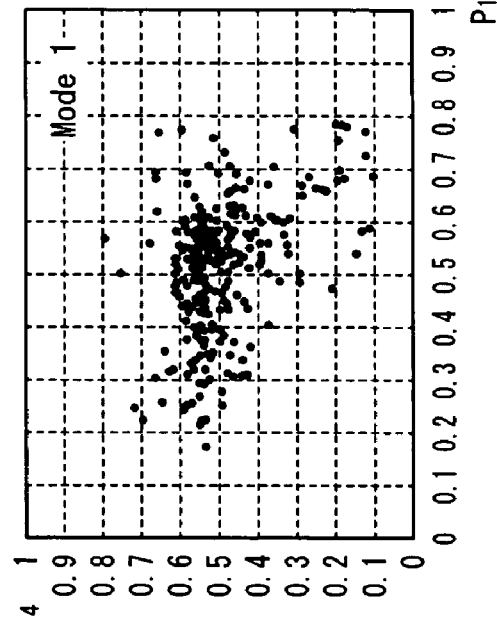
FIG. 4(a) is a diagram explaining a Self-organizing Map according to an embodiment of the present invention, which Self-Organizing Map is created using learning data of engine speed $P_1$ and left hydraulic pump pressure $P_3$ in operation mode 1.
Figure 4B:
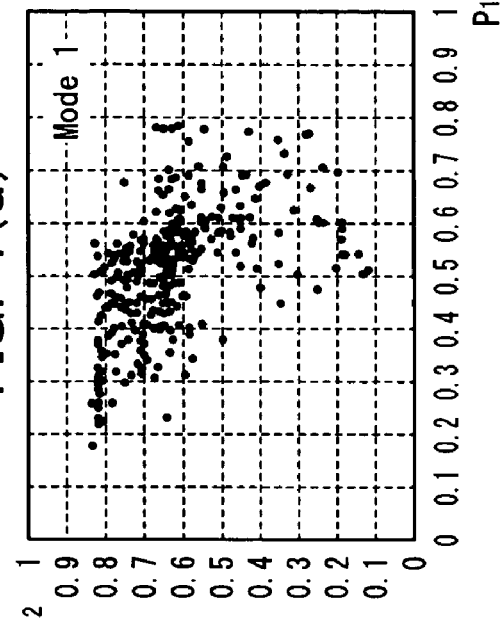
FIG. 4(b) is a diagram explaining a Self-Organizing Map according to an embodiment of the present invention, which Self-Organizing Map is created using learning data of engine speed $P_1$ and right hydraulic pump pressure $P_4$ in operation mode 1.
Figure 4C:
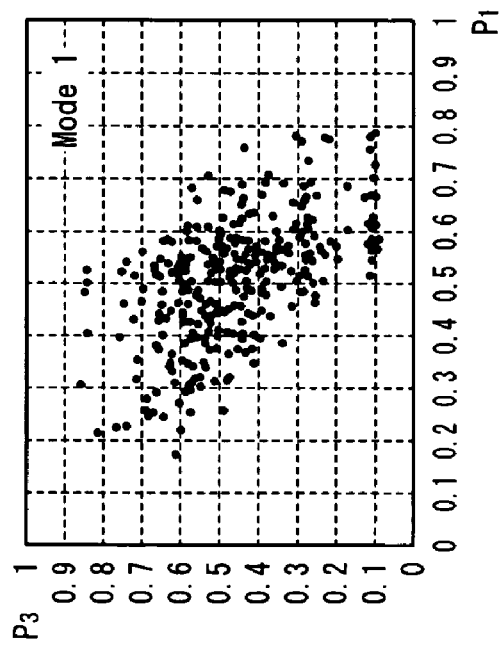
FIG. 4(c) is a diagram explaining a Self-Organizing Map according to an embodiment of the present invention, which Self-Organizing Map is created using learning data of left hydraulic pump pressure $P_3$ and right hydraulic pump $P_4$ in operation mode 1.
Figure 4D:
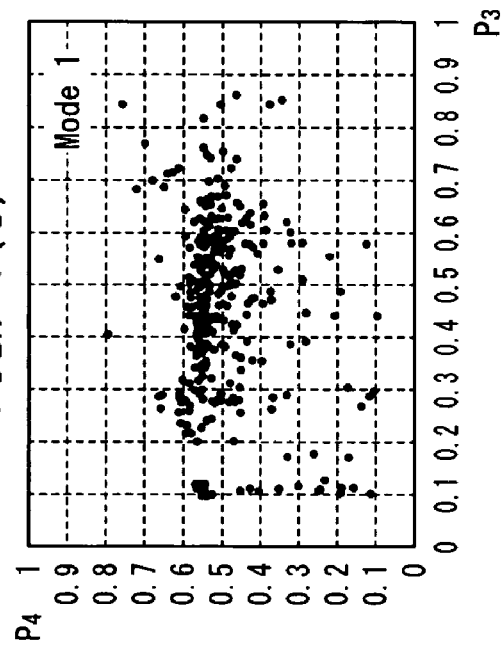
FIG. 4(d) is a diagram explaining a Self-Organizing Map according to an embodiment of the present invention, which Self-Organizing Map is created using learning data of engine speed $P_1$ and fuel consumption amount $P_2$ in operation mode 1.
Figure 5A:
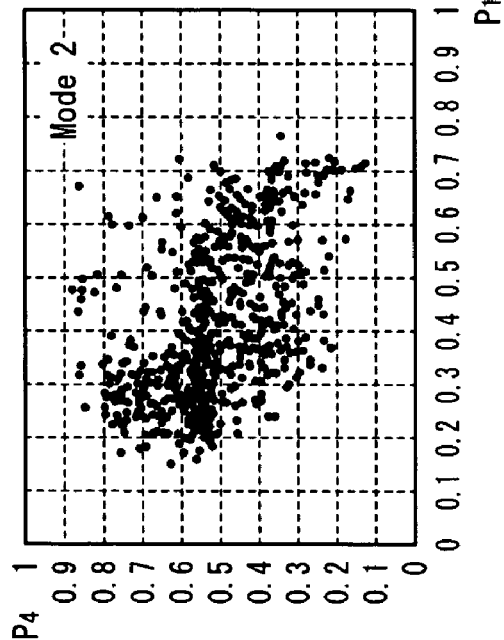
FIG. 5(a) is a diagram explaining a Self-Organizing Map according to an embodiment of the present invention, which Self-Organizing Map is created using learning data of engine speed $P_1$ and left hydraulic pump pressure $P_3$ in operation mode 2.
Figure 5B:
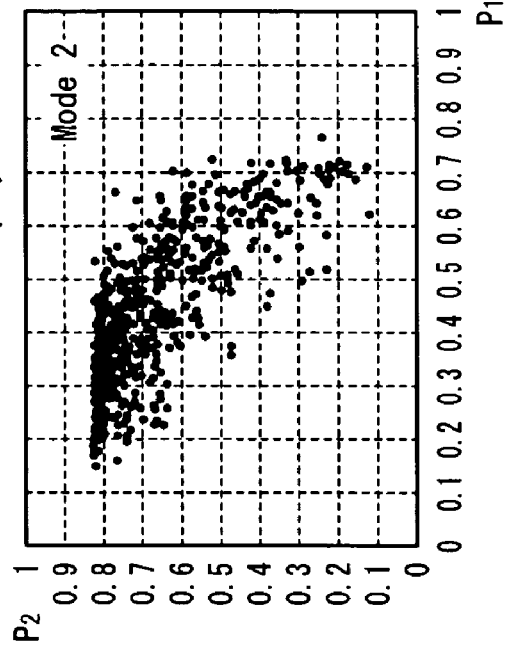
FIG. 5(b) is a diagram explaining a Self-Organizing Map according to an embodiment of the present invention, which Self-Organizing Map is created busing learning data of engine speed $P_1$ and right hydraulic pump pressure $P_4$ in operation mode 2.
Figure 5C:
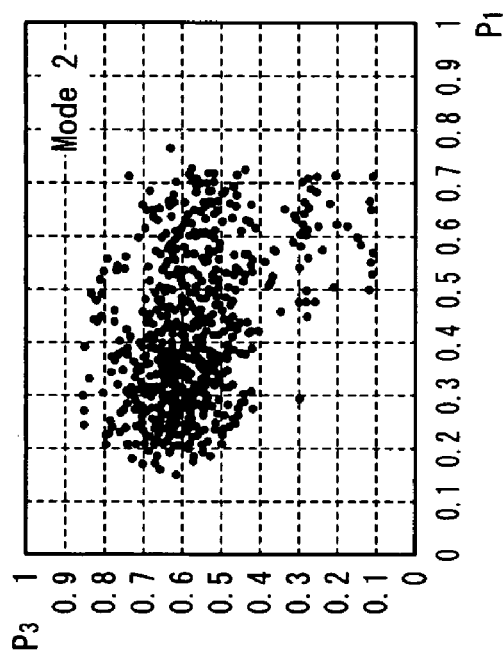
FIG. 5(c) is a diagram explaining a Self-Organizing Map according to an embodiment of the present invention, which Self-Organizing Map is created using learning data of left hydraulic pump pressure $P_3$ and right hydraulic pump $P_4$ in operation mode 2.
Figure 5D:
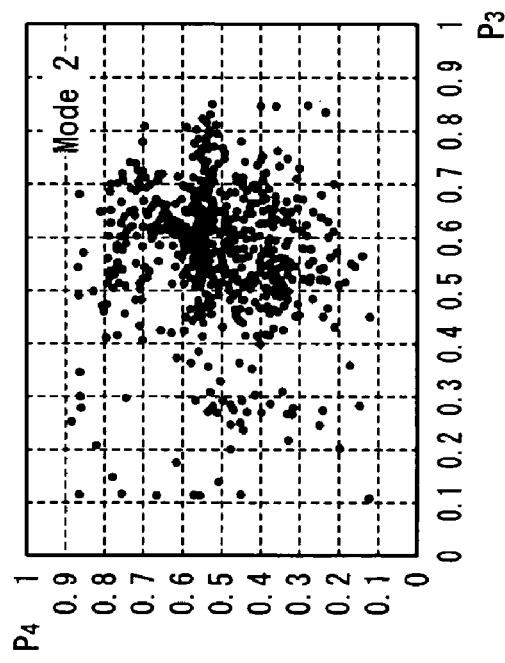
FIG. 5(d) is a diagram explaining a Self-Organizing Map according to an embodiment of the present invention, which Self-Organizing Map is created using learning data of engine speed $P_1$ and fuel consumption amount $P_2$ in operation mode 2.
Figure 6A:
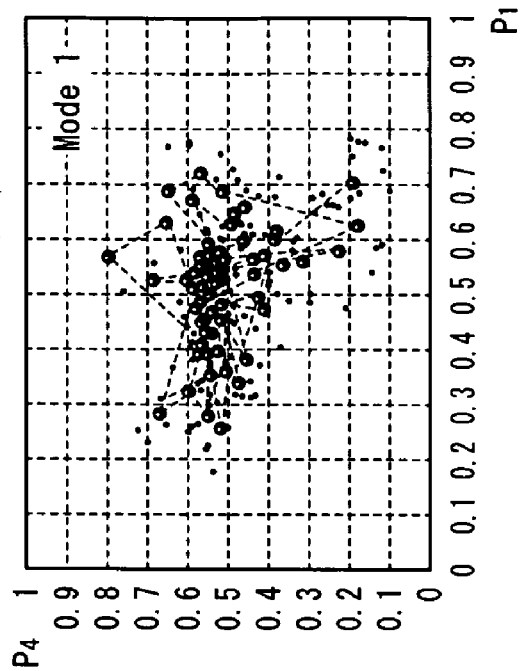
FIG. 6(a) is a diagram explaining a Self-Organizing Map according to an embodiment of the present invention and showing an arrangement of learning data (smaller dots in the drawing) of engine speed $P_1$ and left hydraulic pump pressure $P_3$ in operation model and neurons (larger dots in the drawing) after complete training and deleting of idling neurons.
Figure 6B:
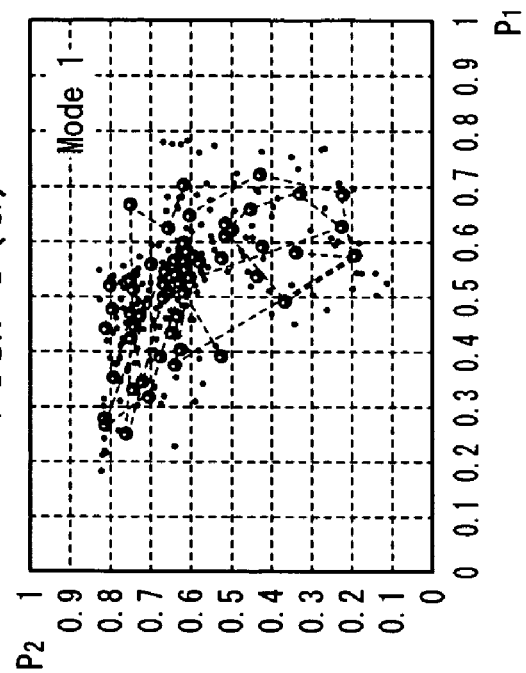
FIG. 6(b) is a diagram explaining a Self-Organizing Map according to an embodiment of the present invention and showing an arrangement of learning data (smaller dots in the drawing) of engine speed $P_1$ and right hydraulic pump pressure $P_4$ in operation mode 1 and neurons (larger dots in the drawing) after complete training and deleting of idling neurons.
Figure 6C:
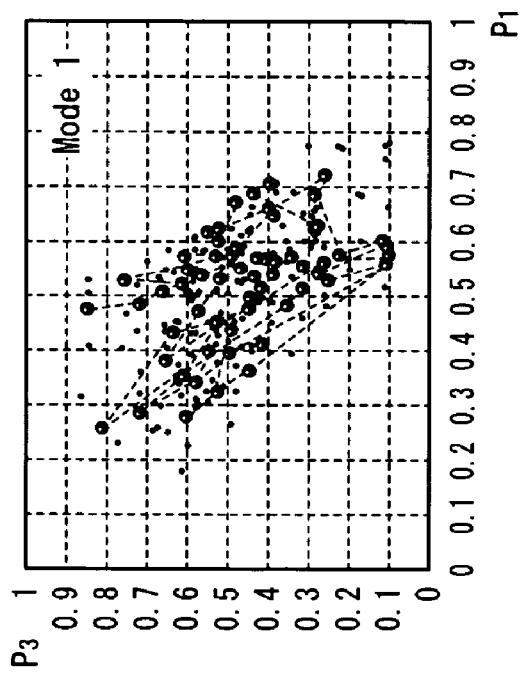
FIG. 6(c) is a diagram explaining a Self-Organizing Map according to an embodiment of the present invention and showing an arrangement of learning data (smaller dots in the drawing) of left hydraulic pump pressure $P_3$ and right hydraulic pump pressure $P_4$ in operation mode 1 and neurons (larger dots in the drawing) after complete training and deleting of idling neurons.
Figure 6D:
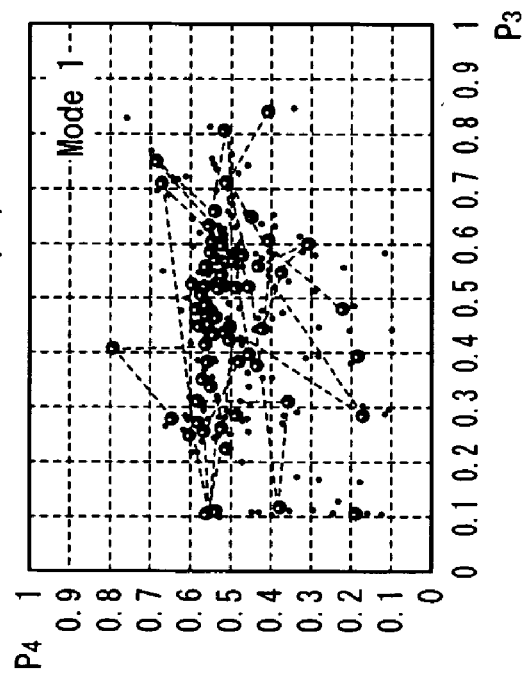
FIG. 6(d) is a diagram explaining a Self-Organizing Map according to an embodiment of the present invention and showing an arrangement of learning data (smaller dots in the drawing) of engine speed $P_1$ and fuel consumption amount $P_2$ in operation mode 1 and neurons (larger dots in the drawing) after complete training and deleting of idling neurons.
Figure 7A:
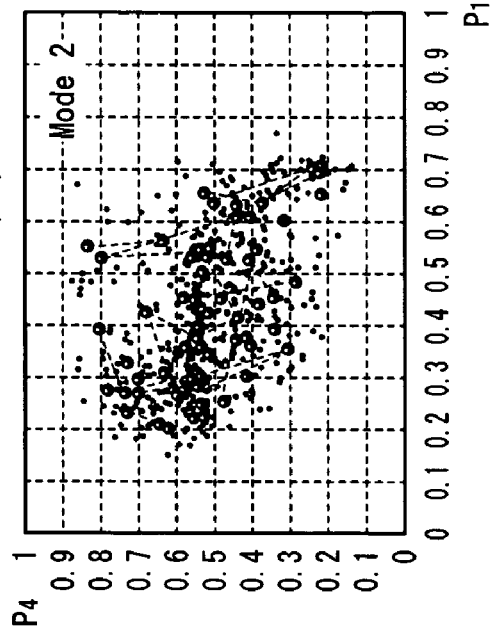
FIG. 7(a) is a diagram explaining a Self-Organizing Map according to an embodiment of the present invention and showing an arrangement of learning data (smaller dots in the drawing) of engine speed $P_1$ and left hydraulic pump pressure $P_3$ in operation mode 2 and neurons (larger dots in the drawing) after complete training and deleting of idling neurons.
Figure 7B:
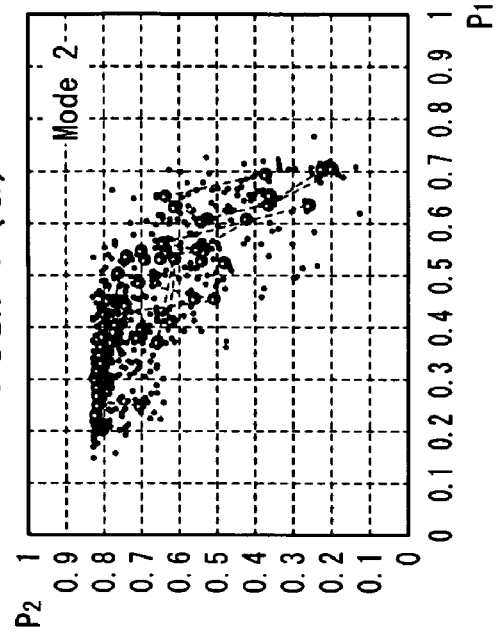
FIG. 7(b) is a diagram explaining a Self-Organizing Map according to an embodiment of the present invention and showing an arrangement of learning data (smaller dots in the drawing) of engine speed $P_1$ and right hydraulic pump pressure $P_4$ in operation mode 2 and neurons (larger dots in the drawing) after complete training and deleting of idling neurons.
Figure 7C:
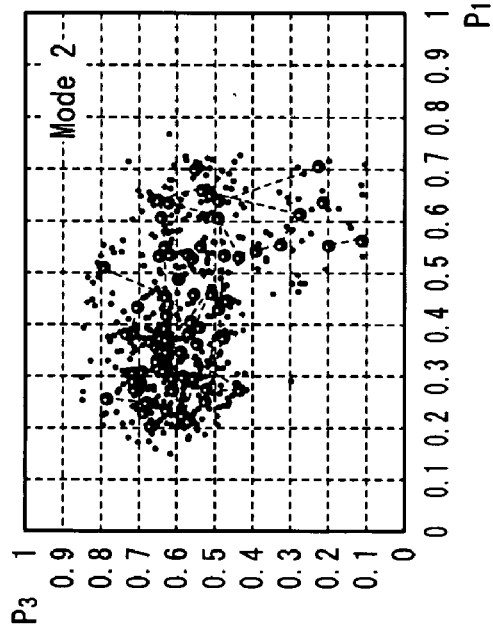
FIG. 7(c) is a diagram explaining a Self-Organizing Map according to an embodiment of the present invention and showing an arrangement of learning data (smaller dots in the drawing) of left hydraulic pump pressure $P_3$ and right hydraulic pump pressure $P_4$ in operation mode 2 and neurons (larger dots in the drawing) after complete training and deleting of idling neurons.
Figure 7D:
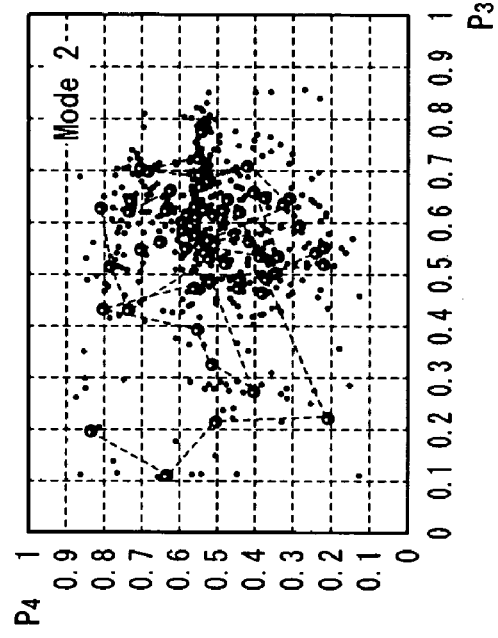
FIG. 7(d) is a diagram explaining a Self-Organizing Map according to an embodiment of the present invention and showing an arrangement of learning data (smaller dots in the drawing) of engine speed $P_1$ and fuel consumption amount $P_2$ in operation mode 2 and neurons (larger dots in the drawing) after complete training and deleting of idling neurons.

FIGS. 4(a), 4(b), 4(c) and 4(d) are graphs of detection data points in the operation mode 1; FIG. 4(a) shows the relationship between the engine speed $P_1$ and the left hydraulic pump pressure $P_3$; FIG. 4(b) shows the relationship between the engine speed $P_1$ and the right hydraulic pump pressure $P_4$; FIG. 4(c) shows the relationship between the left hydraulic pump pressure $P_3$ and the right hydraulic pump pressure $P_4$; and FIG. 4(d) shows the relationship between the engine speed $P_1$ and the fuel consumption amount $P_2$. Since the SOMs (separation models) of FIGS. 4(a), 4(b), 4(c) and 4(d) are eight dimensional, the SOMs are in the form of maps in which winning neurons are arranged in an eight-dimensional space.

FIGS. 5(a), 5(b), 5(c) and 5(d) are graphs of detection data points in the operation mode 2. Since the SOMs (separation models) of FIGS. 5(a), 5(b), 5(c) and 5(d) are also eight dimensional, the SOMs are in the form of maps in which neurons are arranged in an eight-dimensional space.

FIGS. 6(a), 6(b), 6(c) and 6(d) show the best SOMs concerning the operation mode 1 that are to be used in the subsequent real-time process. The smaller dots in FIGS. 6(a) 6(b), 6(c) and 6(d) are the detection data points in the operation mode 1 and the larger dots are neurons after the complete training and deletion of idling neurons have been carried out.

Similarly, FIGS. 7(a), 7(b), 7(c) and 7(d) show the best SOMs concerning the operation mode 2 that are to be used in the subsequent real-time process. The smaller dots in FIGS. 7(a), 7(b), 7(c) and 7(d) are the detection data points in the operation mode 2 and the larger dots are neurons after the complete training and deletion of idling neurons have been carried out.

From FIGS. 6(a), 6(b), 6(c), 6(d), 7(a), 7(b), 7(c) and 7(d), it is obvious that neurons are mainly arranged in the regions with the highest density.

These neurons are used as the representative points of the entire detection data points in the subsequent real-time process.

(B) Real-Time Process:

This process judges which operation mode the hydraulic excavator is currently functioning in, on the basis of the detection data obtained in real time by the hydraulic excavator which is actually functioning. Specifically, calculation is carried out in order to judge which SOM among the four SOMs created in the off-line process described above the real-time detection data obtained here is the most similar to, so that the operation mode corresponding to the SOM that is most similar is determined. The state judging method and the diagnosing method according to this embodiment are used for the procedural steps of this process.

Figure 12:
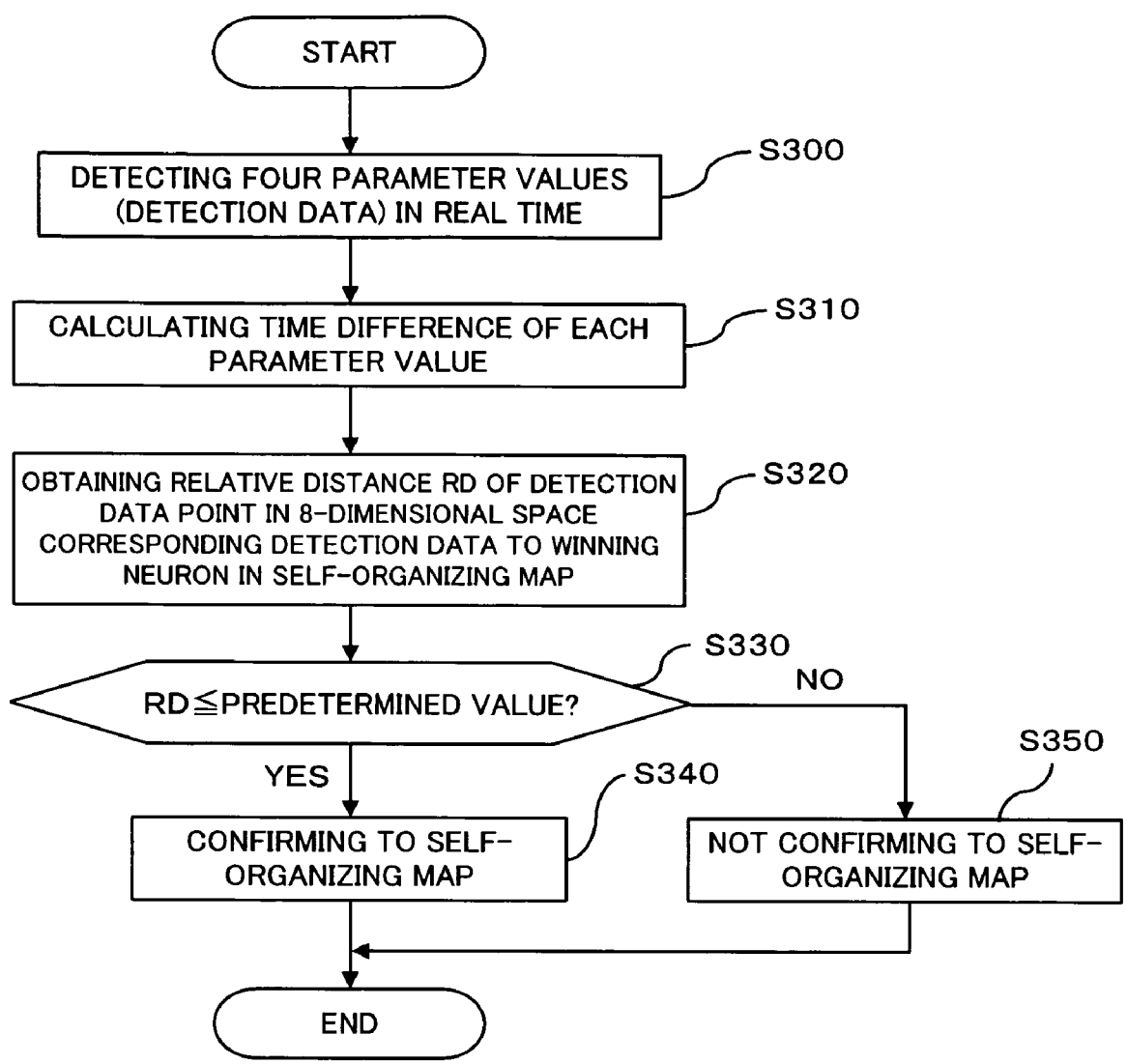
FIG. 12 is a flow chart showing a real-time process according to an embodiment of the present invention.
Figure 13:
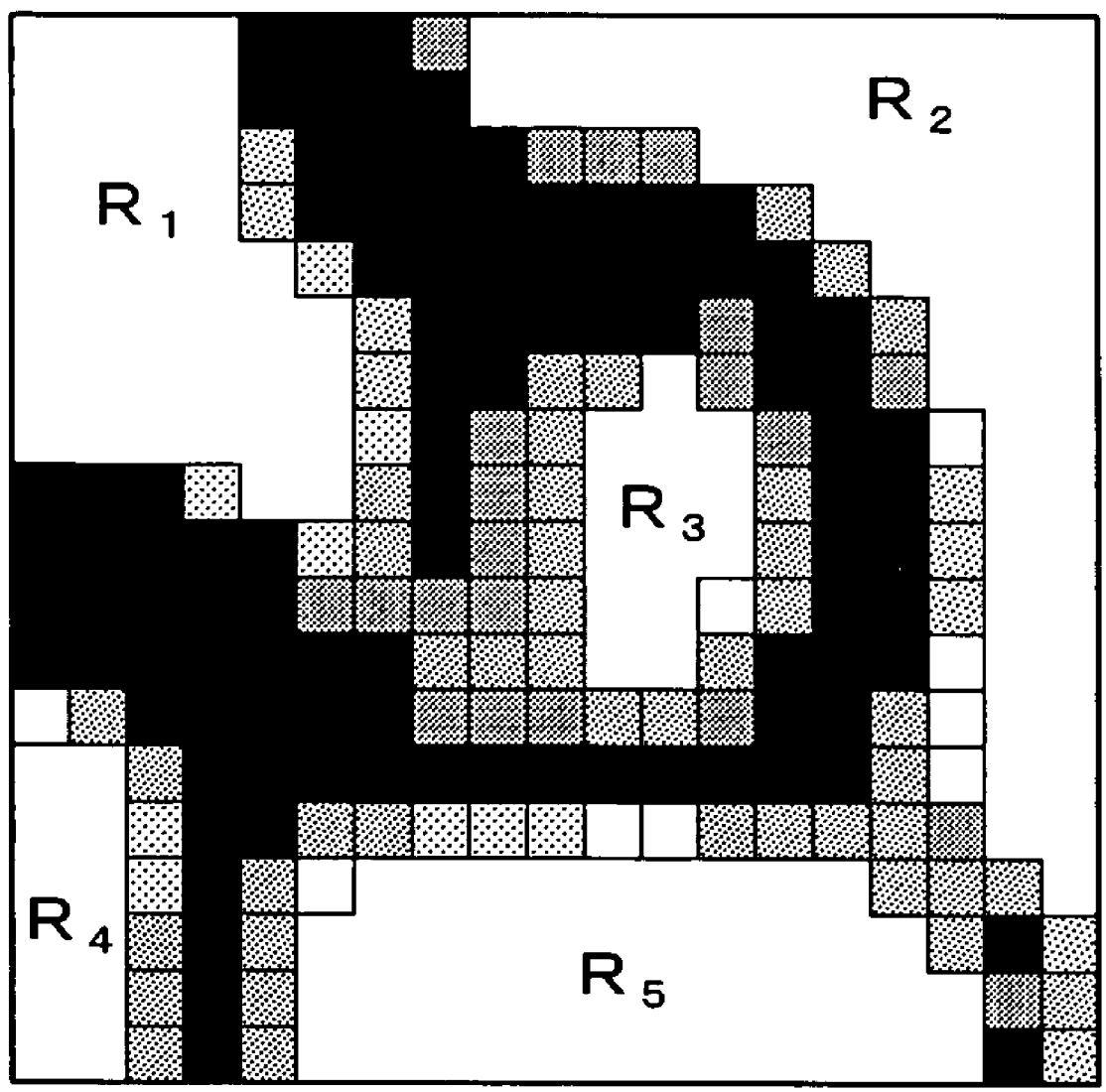
FIG. 13 is a conventional Self-Organizing Map (visualized 2-dimensional map).

As shown in FIG. 12, four parameter values, i.e., detection data, are detected in real time at first (step S300, a step of detecting for state judging). The parameter values detected in step S300 are processed to calculate time differences (including values corresponding to time differences, (such as variation rates of parameter values (e.g., variation amounts per unit time exemplified by detection period time)) $\Delta d(k)$ of the parameter values (step S310, a step of calculating). Namely, the detection data is eight-dimensional data including four $d(k)$ and four $\Delta d(k)$ similar to data in the off-line process.

Next, the similarity degrees SDs of the current detection data to SOMs, one concerning each of the operation modes, are obtained. There are a number of manners to calculate a similarity degree SD, but the present embodiment obtains similarity degrees SDs by using Euclidean distance, i.e., distance of a current detection data point to a winning neuron in a SOM.

The similarity degree thus obtained is divided by the average minimum distance $AV_{min}$ to thereby obtain the relative distance RD ($=SD/AV_{min}$) between the current detection data point and the winning neuron. The winning neuron here is a neuron having the shortest distance to a data point (a single point) detected in real time. The calculation for a relative distance RD is performed on each of the four SOMs (step S320).

Whether or not the relative distance RD that has been calculated as above is equal to or smaller than a predetermined value (1+α), i.e., whether or not RD≦1+α (α is a threshold value previously determined) is judged (step S330). If the relative distance is equal to or less than the predetermined value, the detection data point is judged to conform with the SOM and the SOM is stored in a storage unit to be a candidate (step S340). In other words, this means that the above detection data point can be classified into an operation mode associated with the conforming SOM.

Conversely, if the relative distance RD is (equal to or) larger than the predetermined value, the detection data point is judged not to conform with the SOMs (step S350). In other words, that means that the above detection data point cannot be classified into any operation modes. The steps S320-S340 are the step of judging. Appropriate setting of the above predetermined value (1+α) can determine a criterion for judging as to whether or not a detection data point conforms to a SOM in accordance with the circumstances.

The above judgment is performed on SOMs for the four operation modes, and if there are two or more SOMs conforming with a detection data point (i.e., there are two or more operation modes conforming), the operation modes corresponding to the SOMs are notified to an operator via the monitor 6. In this case, the operation modes are displayed in order of smaller relative distances, i.e., in order of higher similarity degree, so that the operator easily grasps the display of the operation modes.

If there is no SOM that conforms with the detection data point (i.e., there is no operation mode conforming), the operator is notified that the detection data point is in an "unknown operation mode" that has not been trained in the off-line process or in an "abnormal mode" via the monitor 6. Such a display of the presence or the absence of abnormality on the hydraulic excavator currently functioning can issue a kind of alert to the operator.

One of the characteristics of the real-time process according to the present operation is adaptability. Specifically, if the operator of the hydraulic excavator operates the hydraulic excavator in a new operation mode, detection data concerning only the new operation mode is obtained and is subjected to training, so that a new $SOM_{z+1}$ can be created. The new $SOM_{z+1}$ can be added to the SOMs that have been already used. In other words, the off-line process in this embodiment has created the four SOMs, corresponding one to each of the four operation modes; if the new SOM is added, the present embodiment creates and stores five SOMs in total.

As mentioned above, if addition of a new SOM is intended, the entire model for classification can be updated with ease simply by adding the $SOM_{z+1}$ serving as a new separation model to the entire model. For this reason, there is no requirement for recreation of the entire model (i.e., an entire conventional visualized two-dimensional map) for classification from the beginning which conventional creation techniques have required. Adding new a operation mode at any time in this manner can diagnose each operation more precisely.

Figure 8:
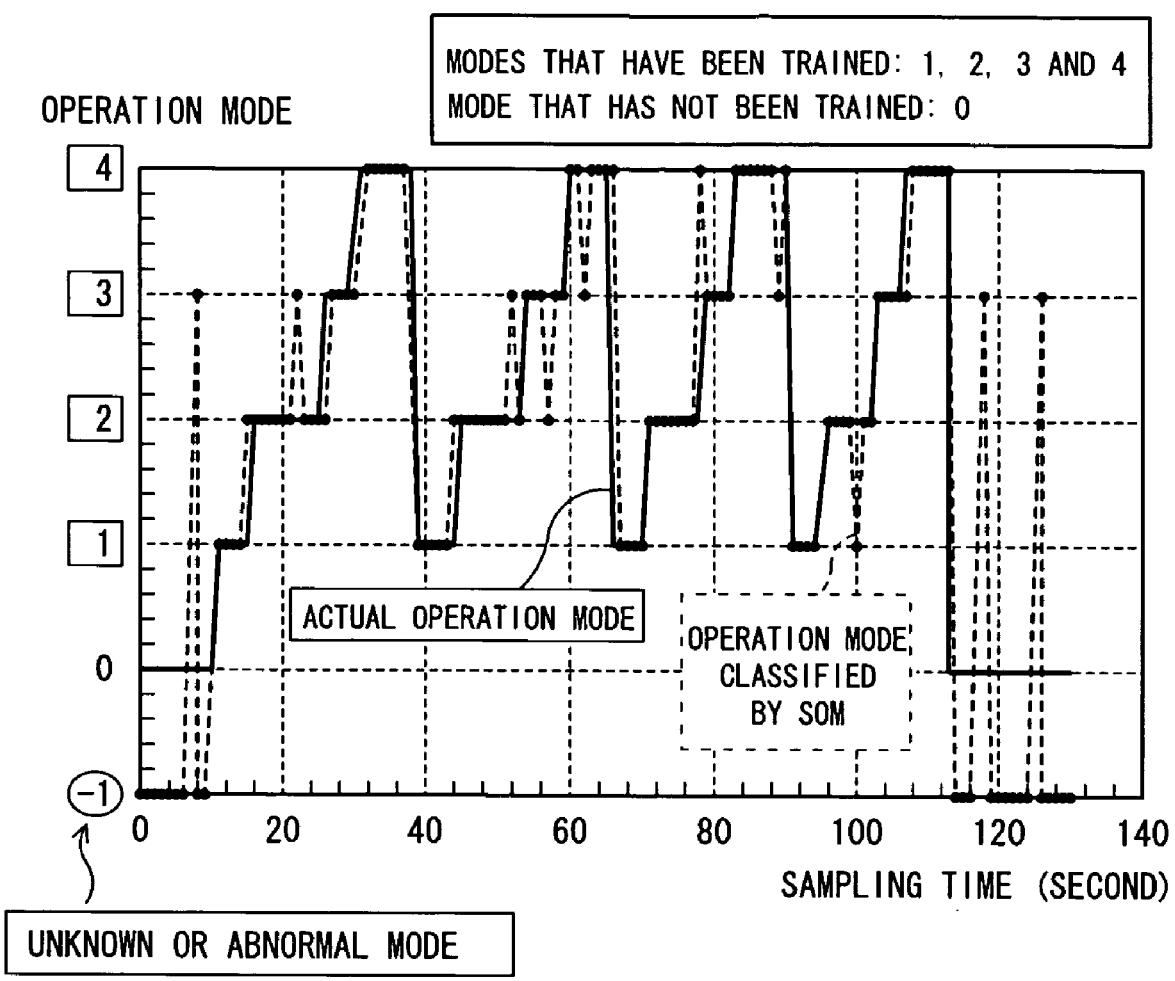
FIG. 8 is a diagram showing an example of a result of judgment on operation mode according to an embodiment of the present invention.

FIG. 8 shows an example of the judgment result of operation mode made by the diagnostic unit according to this embodiment. In FIG. 8, the solid line indicates the actual operation modes of the hydraulic excavator, and the broken line indicates operation modes classified using SOMs. In the present embodiment, operation modes that have previously trained in the off-line process are the operation mode "1", the operation mode "2", the operation mode "3" and the operation mode "4", and an operation mode (e.g., a mode in which the hydraulic excavator is idling) that has not been previously trained is operation mode "0". An operation mode "-1" indicates an unknown mode or an abnormal mode.

As can be seen from FIG. 8, although an operation mode is sometimes judged to be an operation different from the actual operation mode, correct judgment of operation mode substantially in coordination with the actual operation modes is carried out.

One embodiment of the present invention has been described above, but the present invention should by no means be limited to the foregoing embodiment and various modifications can be suggested without departing from the concept of the present invention.

For example, the present embodiment uses the detection data of d(k) and Δd(k) without processing. Alternatively, these values may not be directly used but may be used after being subjected to smoothing carried out by a primary filter.

The number of neurons that is used for creation of a SOM may be increased of course although calculation will require longer time. In this manner, a more precise SOM can be created.

Further, the present embodiment has made description regarding a hydraulic excavator as an example of an object that functions in a number of operation modes. But, the object should not be limited to a hydraulic excavator only. The present invention can also be applied to right-wrong judgment of operations performed by a conveyance such as a truck, a bus or a vessel or by machines such as an industrial machine, and also applied to right-wrong judgment of living organisms such as animals or plants and to estimation of changes in weather or in a celestial body such as the earth.

Figure 9:
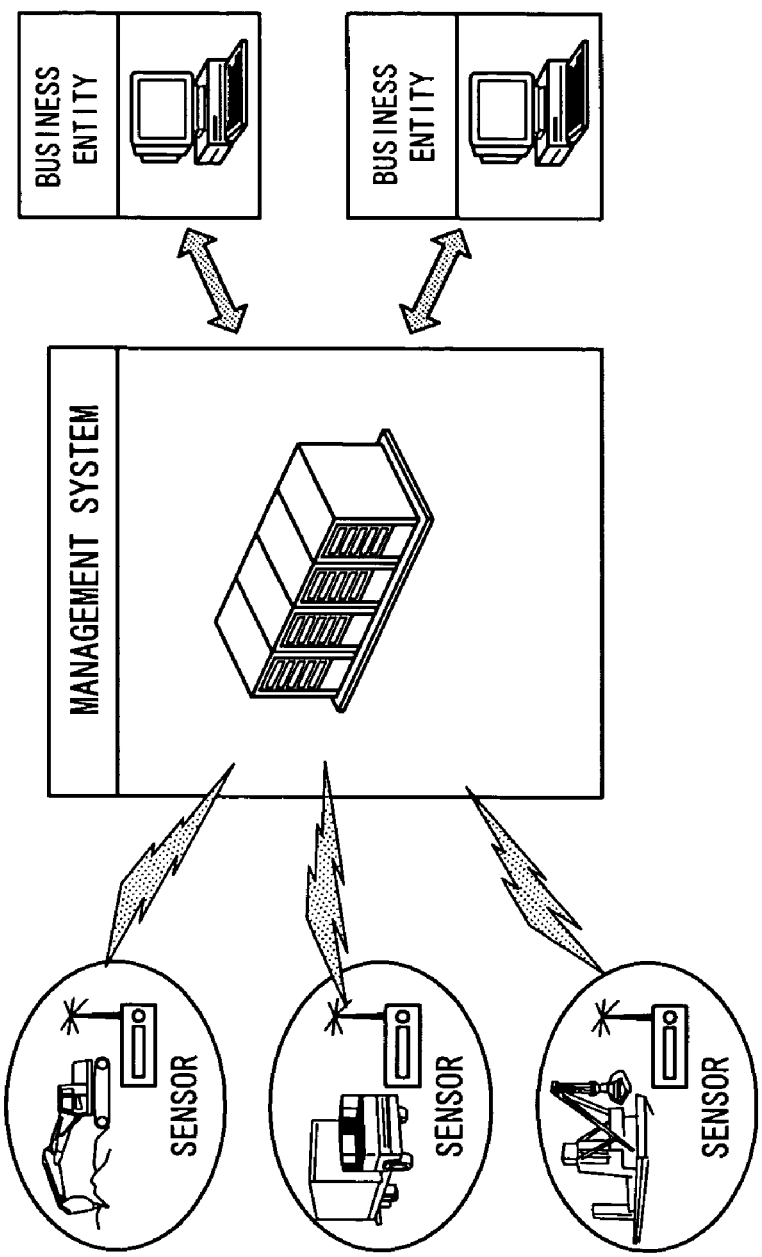
FIG. 9 is a diagram illustrating a diagnostic unit according to a modification of the present invention.

In this embodiment, the diagnostic unit is installed in the hydraulic excavator and the diagnosing process is carried out in the hydraulic excavator in a lump. Alternatively, as shown in FIG. 9, only sensors are installed in a mobile machine such as a hydraulic excavator and a computer including the SOM creating means 2, the storage unit 3, the judging means 4 and the monitor 6 described in the present embodiment is installed in a business entity, so that a diagnosing can be carried out with ease at the business entity by sending detection data from the sensors to the computer and displaying the sent data on the computer even if it is remote from the mobile machine. Further, the example shown in FIG. 9 interposes a management system between mobile machines and business entities. In particular, if an object is a mobile machine such as a construction machine, a truck, a bus or a vessel, the configuration of the diagnostic unit according to the present invention can fulfill the demands for higher maintenance and higher efficiency for maintenance for reasons of inefficiency due to geometric distribution.

INDUSTRIAL APPLICABILITY

As described above, since the present invention can precisely recognize each operation of an object, such as a construction machine, that is able to function in a number of operation modes if applied to the object, the usability of the present invention is considered to be extremely high.

What is claimed is:

1. An information processor of construction machinery, comprising:
    detecting means for detecting a multiplicity of combinations of n parameter values, where n is a natural number, for each of a plurality of operation modes in which an object functions, which values vary with operation of the construction machinery; and
    Self-Organizing Map creating means for calculating n values by transforming the n parameter values into its derivative, including variation rates of the n parameter values, which have been detected with respect to time and that indicate a variation in a momentary state of the object, and creating a Self-Organizing Map by using detection data, obtained on the basis of the multiple combinations of both n values and n parameter values detected by said detecting means, as learning data;
    wherein said Self-Organizing Map creating means creates a plurality of the Self-Organizing Maps, serving as individual separation models and corresponding one to each of the plurality of operation modes,
    wherein the operation modes are representative of the operation of the construction machinery,
    wherein said detecting means includes one or more sensors, and
    wherein the Self-Organizing Maps control the operation of the construction machinery for each of the construction machinery's operation modes.

2. An information processor according to claim 1, wherein said detecting means detects the multiple combinations of n parameter values; and
    said Self-Organizing Map creating means initially arranges a predetermined number of neurons at random in a 2n-dimensional space, carries out training regarding a point of the detection data in the 2n-dimensional space as a learning data point, creates a Self-Organizing Map candidate regarding a neuron having a minimum distance to the learning data point as a winning neuron, and selects, from two or more of the Self-Organizing Map candidates obtained by carrying out the creating of a Self-Organizing Map candidate a number of times, a Self-Organizing Map candidate which has a characteristic closest to that of the learning data as the Self-Organizing Map.

3. An information processor according to claim 2, said Self-Organizing Map creating means calculates an average f distances of the winning neurons to the points in the learning data and a standard deviation of the distances of the winning neurons to the points in the learning data for each of the Self-Organizing Map candidates, and selects a Self-Organizing Map candidate the average and the standard deviation of which are both minimum as the Self-Organizing Map.

4. An information processor according to claim 3, wherein, if there is no Self-Organizing Map candidate the average and the standard deviation of which are both minimum, said Self-Organizing Map creating means selects a Self-Organizing Map candidate the average of which is minimum as the Self-Organizing Map.

5. An information processor according to claim 2, wherein said Self-Organizing Map creating means deletes a neuron which has never become a winning neuron among neurons in the Self-Organizing Map that has been selected.

6. A state judging unit for judging a state of an object, comprising:
 a storage unit for storing individual separation models in the form of the plural of the Self-Organizing Maps, created one for each of the plurality of operation modes by an information processor defined in claim 1;
 said detecting means; and
 judging means for judging which operation mode an operation of the object corresponds to based on a relative distance between a detection data point in 2n dimension corresponding to detection data obtained by said detecting means in real time and a winning neuron in each of said plural Self-Organizing Maps.

7. A state judging unit according to claim 6, wherein said detecting means calculates the relative distance by dividing the distance between the detection data point obtained by said detecting means in real time and the winning neuron in each said Self-Organizing Map by the average of distances of the wining neurons in the Self-Organizing Map to the learning data point used in the process of creating each said Self-Organizing Map in the information processor.

8. A state judging unit according to claim 6, wherein said judging means judges that, if the relative distance of one of said plural Self-Organizing Maps is equal to or smaller than a predetermined threshold value, the detection data point conform with the one Self-Organizing Map, and that, if the relative distance of said Self-Organizing Map is larger than the threshold value, the detection data point does not conform with said one Self-Organizing Map.

9. A diagnostic unit, including a state judging unit defined in claim 6, for diagnosing the object, wherein the object is a machine including a construction machine, and the plural operation modes represent a particular operation performed by said machine.

10. An information processing method of construction machinery, comprising:
 detecting a multiplicity of combinations of n parameter values, where n is a natural number, for each of a plurality of operation modes in which an object functions, which values vary with operation of the construction machinery;
 calculating n values by transforming the n parameter values into its derivative, including variation rate of the n parameter values, which have been detected with respect to time and that indicate a variation in a momentary state of the object; and
 creating a Self-Organizing Map by using detection data, obtained on the basis of the multiple combinations of n parameter values detected in said step of detecting and n values calculated in said calculating step, as learning data,
 wherein, in said step of Self-Organizing-Map creating, a plurality of the Self-Organizing Maps, serving as individual separation models, are created one for each of the plurality of operation modes,
 wherein the operation modes are representative of the operation of the construction machinery, wherein, in said step of detecting, the multiple combinations of n parameter values are detected by one or more sensors, and
 wherein the Self-Organizing Maps control the operation of the construction machinery for each of the construction machinery's operation modes.

11. An information processing method according to claim 10, wherein:
 the multiple combinations of n parameter values are detected in said step of detecting; and
 said step of Self-Organizing-Map includes,
 creating a Self-Organizing Map candidate by initially arranging a predetermined number of neurons at random in a 2n-dimensional space, carrying out training regarding a point of the detection data in the 2n-dimensional space as a learning data point and creating a Self-Organizing Map candidate regarding a neuron having a minimum distance to the learning data point as a winning neuron, and
 selecting, from two or more Self-Organizing Map candidates created by carrying out said step of creating a Self-Organizing Map candidate a number of times, a Self-Organizing Map candidate which has a characteristic closest to that of the learning data as the Self-Organizing Map.

12. An information processing method according to claim 11, wherein said step of Self-Organizing-Map creating further includes a sub-step of, after said sub-step of selecting a Self-Organizing Map, deleting an idling neuron which has never become a winning neuron among neurons in the Self-Organizing Map that has been selected.

13. An information processing method according to claim 10 wherein:
 when a Self-Organizing Map for a new operation mode of the object other than the plural operation modes is added,
 the n parameter values are detected by said step of detecting while the object is functioning in the new operation mode by said step of detecting, and
 a Self-Organizing Map for the new operation mode is created regarding detection data based on a multiplicity of combinations of the parameter values that have been detected as learning data by said step of Self-Organizing-Map creating.

14. A state judging method for judging which operation mode an operation of the object corresponds to using a plurality of Self-Organizing Maps, serving as individual separation models and created one for each of a plurality of operation modes by an information processing method according to claim 10, comprising:
 detecting the n parameter values that vary with operation; and
 judging which operation mode an operation of the object corresponds to based on a relative distance between a detection data point in a 2n-dimensional space corresponding to detection data obtained in real time in said step of detecting and a winning neuron in each of the plural Self-Organizing Maps.

15. A state judging method according to claim 14, further comprising:
   between said step of detecting and said step of judging, calculating n time-difference values by processing the n parameter values detected in said step of detecting,
   the operation mode of the object is judged based on 2n-dimensional data including the n parameter values, which have been detected and which indicate the momentary state of the object, and the n time-difference values, which have been processing the n parameter values detected in said step of detecting and which indicate the variation in the momentary state of the object, in said step of judging.

16. A state judging method according to claim 15, wherein, said step of judging comprises,
   obtaining the relative distance by dividing the distance between the detection data point obtained in real time in said step of detecting and the winning neuron in the Self-Organizing Map by the average of distances of the winning neurons in each said Self Organizing Map to the learning data point used in the process of creating the Self-Organizing Map carried out by the information processor,
   if the relative distance of each said the plural Self-Organizing Maps is equal to or smaller than a predetermined threshold value,
   judging the detection data point to conform with the last-named Self Organizing Map, and
   if the relative distance of each said Self Organizing Map is larger than the threshold value,
   judging the detection data point not to conform with said one Self Organizing Map.

17. A diagnosing method, including a state judging method defined in claim 14, for diagnosing the object wherein the object is a machine including a construction machine, and the plural operation modes represent a particular operation performed by said machine.

18. A diagnosing method according to claim 17, wherein, if there is no Self-Organizing Map conforming, the particular operation is judged to be an unknown mode or an abnormal mode in said step of judging.

19. An information processor according to claim 1, wherein if the parameter values are represented by d(k), the N values are represented by $$\Delta d(k) = \frac{d}{dt} d(k),$$

where, k represents current time, and d(k) represents the momentary state of the construction machinery.

20. An information processor according to claim 10, wherein if the N parameter values are represented by d(k), the N values are represented $$\Delta d(k) = \frac{d}{dt} d(k),$$

where, k represents current time, and d(k) represents the momentary state of the construction machinery.

* * * * *